(12) United States Patent
Kogen et al.

(10) Patent No.: US 7,484,089 B1
(45) Date of Patent: Jan. 27, 2009

(54) METHOD AND SYSTEM FOR CERTIFICATE DELIVERY AND MANAGEMENT

(75) Inventors: Mark Kogen, Lawndale, CA (US);
Herve Garcia, Calabasas, CA (US);
Fred Pinn, Studio City, CA (US); Elton Lin, New York, NY (US); Warren Tan, Thousand Oaks, CA (US)

(73) Assignee: Citicorp Developmemt Center, Inc., Cincinnati, OH (US)

( * ) Notice: Subject to any disclaimer, the term of this patent is extended or adjusted under 35 U.S.C. 154(b) by 531 days.

(21) Appl. No.: 10/985,414

(22) Filed: Nov. 10, 2004
(Under 37 CFR 1.47)

Related U.S. Application Data

(63) Continuation-in-part of application No. 10/657,655, filed on Sep. 8, 2003, now abandoned.

(60) Provisional application No. 60/408,616, filed on Sep. 6, 2002.

(51) Int. Cl.
*H04L 21/00* (2006.01)

(52) U.S. Cl. .................. 713/156; 713/158; 713/175; 726/10

(58) Field of Classification Search .......... 713/156, 713/157–158, 168, 175; 726/10
See application file for complete search history.

(56) References Cited

U.S. PATENT DOCUMENTS 6,189,098 B1 * 2/2001 Kaliski, Jr. ............. 713/168

7,010,683 B2 * 3/2006 Corella ................. 713/156
2001/0032310 A1 * 10/2001 Corella ................. 713/156

(Continued)

OTHER PUBLICATIONS

D. Toni Merschen, A Digital Identity Business: Financial Services, London Oct. 18, 2000, Citigroup, Retrieved Date Oct. 5, 2006.*
Merschen, Toni, Dr., "A Digital Identity Business: Financial Services," London, Oct. 18, 2000, Citigroup, Retrieved Date: Oct. 5, 2006.

*Primary Examiner*—Gilberto Barron, Jr.
*Assistant Examiner*—Samson B Lemma
(74) *Attorney, Agent, or Firm*—George T. Marcou; King & Spalding LLP

(57) ABSTRACT

A method and system for combining multiple access points and utilizing certificates as an access method to a system from multiple access points enables use of a certificate that is stored within a smart card to access a host system through a browser, such that when the user accesses the application on the server, the application requires that the card and certificate be present for authentication of the individual user, and concurrently allows an external system to access applications on a host server using a certificate stored on the external system for authenticating itself to the host server. A certificate for certificate-based authentication is created and distributed to a choice of storage methods, such as a microcomputer of an integrated chip card, a computer disk of a computing device disposed in a secure environment, or a Hardware Security Module (HSM) associated with the computing device. The certificate is managed over its life span at least partly via a Lightweight Directory Assistance protocol (LDAP) directory shared by a certificate authority (CA) and the host system. Access to the host system is allowed using the certificate for public key-based authentication to the host system.

41 Claims, 25 Drawing Sheets

U.S. PATENT DOCUMENTS

2002/0026578 A1* 2/2002 Hamann et al. ............. 713/159
2002/0112156 A1* 8/2002 Gien et al. ................. 713/156
2003/0005289 A1* 1/2003 Gougeon et al. ............ 713/156
2003/0154376 A1* 8/2003 Hwangbo .................. 713/173
2003/0177357 A1* 9/2003 Chamberlin et al. ........ 713/168
2005/0160277 A1* 7/2005 Sciupac ..................... 713/185

* cited by examiner

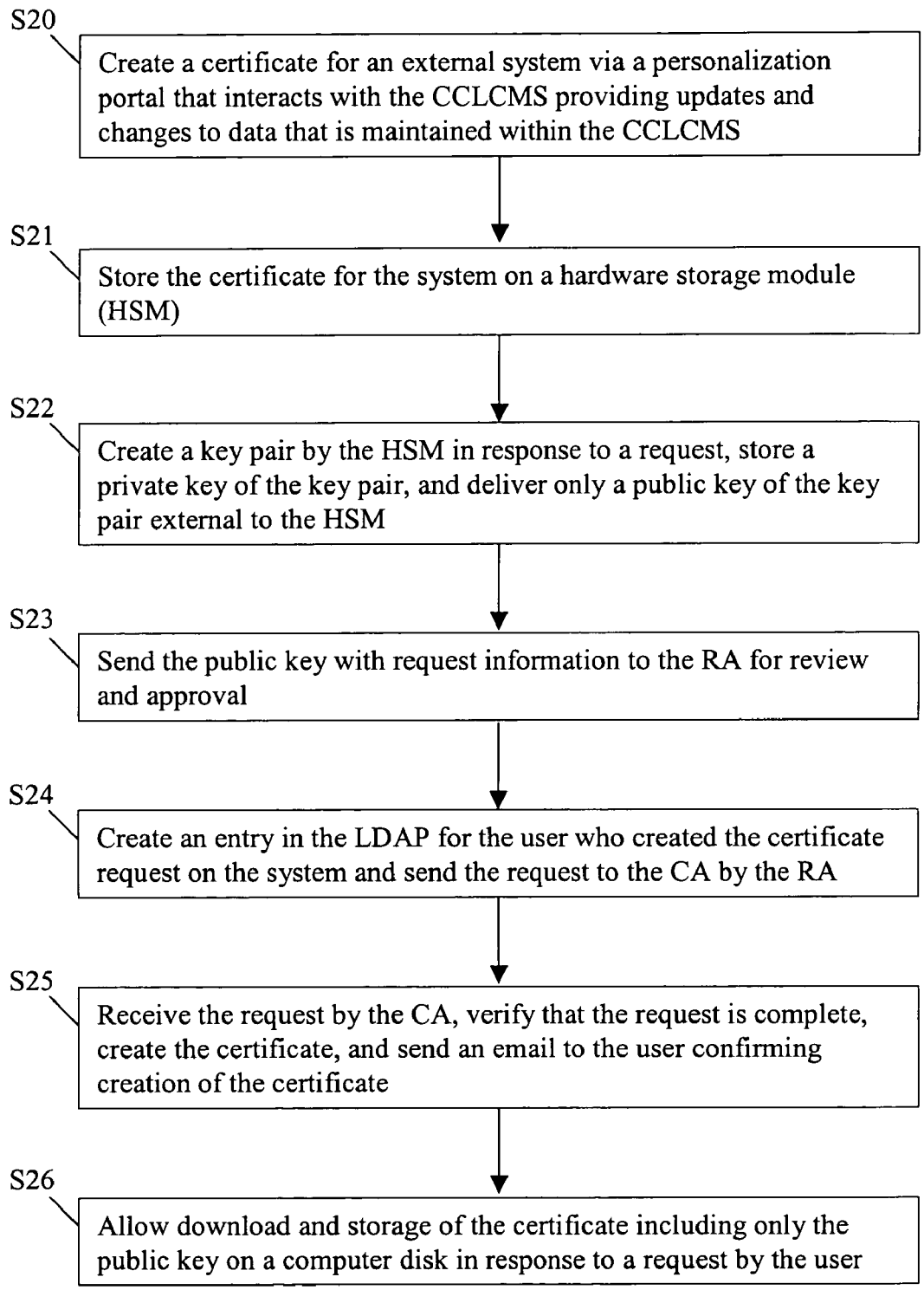

S20 Create a certificate for an external system via a personalization portal that interacts with the CCLCMS providing updates and changes to data that is maintained within the CCLCMS

S21 Store the certificate for the system on a hardware storage module (HSM)

S22 Create a key pair by the HSM in response to a request, store a private key of the key pair, and deliver only a public key of the key pair external to the HSM

S23 Send the public key with request information to the RA for review and approval

S24 Create an entry in the LDAP for the user who created the certificate request on the system and send the request to the CA by the RA

S25 Receive the request by the CA, verify that the request is complete, create the certificate, and send an email to the user confirming creation of the certificate

S26 Allow download and storage of the certificate including only the public key on a computer disk in response to a request by the user

METHOD AND SYSTEM FOR CERTIFICATE DELIVERY AND MANAGEMENT

CROSS-REFERENCE TO RELATED APPLICATIONS

This application is a continuation-in-part of U.S. patent application Ser. No. 10/657,655 entitled "Method and System for Certificate Delivery and Management" filed Sep. 8, 2003 now abandoned, which claims the benefit of U.S. Provisional Application No. 60/408,616 entitled "Method and System for Certificate Delivery and Management" filed Sep. 6, 2002, both of which are incorporated herein by this reference.

FIELD OF THE INVENTION

The present invention relates generally to the field of certificate delivery and management, and more particularly to a method and system for creating and managing certificates used for combining multiple access points and utilizing certificates as an access method to a system from multiple access points.

BACKGROUND OF THE INVENTION

Certificate technology and certificate-based access to systems is prevalent and existent within the industry today. However, there is a present need for a specific deployment of the certificate-based access method over multiple different types of access vehicles which, for example, enables users to utilize a certificate that is stored within a smart card to access a host system through a browser, such that when the user accesses the application on the server, the application requires that the card and certificate be present for authentication of the individual user, and concurrently allows systems which need access to applications on a server to use a certificate stored on that system for authentication of itself to the server.

SUMMARY OF THE INVENTION

It is a feature and advantage of the present invention to provide a method and system for combining multiple access points and using certificates as an access method to a system from multiple access points that enables users to utilize a certificate that is stored within a smart card to access the host system through a browser.

It is a further feature and advantage of the present invention to provide a method and system for combining multiple access points and utilizing certificates as an access method to a system from multiple access points that provides access to the entire system using certificates and populating the certificates across multiple, different storage mechanisms.

It is another feature and advantage of the present invention to provide a method and system for combining multiple access points and utilizing certificates as an access method to a system from multiple access points that manages the creation and distribution of those certificates across several different storage methods.

It is an additional feature and advantage of the present invention to provide a method and system for combining multiple access points and utilizing certificates as an access method to a system from multiple access points that provides management of the certificates over the life span of the certificate.

It is a still further feature and advantage of the present invention to provide a method and system for combining multiple access points and utilizing certificates as an access method to a system from multiple access points that provides re-issuance and revocation of certificates.

It is still another feature and advantage of the present invention to provide a method and system for combining multiple access points and utilizing certificates as an access method to a system from multiple access points that manages certificates across these multiple methods.

To achieve the stated and other features, advantages and objects, an embodiment of the present invention provides a method and system for creating and managing certificates used for combining multiple access points and utilizing certificates as an access method to a system from multiple access points. A specific deployment aspect of the present invention employs the certificate-based access method over multiple different types of access vehicles. Users are able to utilize a certificate that is stored within a smart card, and when they need to access the host system, through a browser, the user accesses the application on the server, and the application requires that the card and certificate be present for authentication of the individual user. In addition, other systems have rights to access the host system, also providing updated information. Both systems require the same level of access control, which means a public key-based authentication. In order to accomplish that, certificates stored on the system are also used.

An embodiment of the invention involves, for example, creating and distributing a certificate for certificate-based authentication to any one of a several storage methods, such as a microcomputer of an integrated chip card, such as a smart card, a computer disk of a computing device, such as a personal computer (PC) disposed in a secure environment, or a Hardware Security Module (HSM) associated with a computing device, such as the PC. In the aspect in which the certificate is stored on the microcomputer of the smart card, an initialization workstation prepares a key pair for the card and places a unique Personal Identification Number (PIN) on the card. In response to a request for the certificate received by a Certificate Authority (CA) via a Registration Authority (RA), the CA creates and signs the certificate and posts a copy of the certificate to a Lightweight Directory Assistance Protocol (LDAP) directory shared by the CA and a host system in a location in which log-in rights and access rights for a holder of the card are identified to the host system. For security purposes, the card and PIN are distributed to the cardholder through separate channels.

In the aspect in which the certificate is stored on the computer disk of the computing device, the certificate is created via a badging station (as one example of a computing device) that interacts with the host system and stores an encrypted private key for the certificate on the computer disk at the badging station. In this aspect, the user on an external system is allowed to request the certificate via the badging station, and the user's request is sent to the CA via the RA for creation of the certificate. The CA creates the certificate and posts the certificate to the LDAP directory shared by the CA and the host system, and an email notice of the certificate is sent to the requesting user, who is allowed to download and store the certificate on the computer disk.

In the aspect in which the certificate is stored on the HSM associated with the computing device, a key pair is created by the HSM in response to a request from a user, a private key of the key pair is stored on the HSM, and only a public key of the key pair is delivered external to the HSM. An entry in the LDAP is created for the user and the user's request for the certificate is sent to the CA by the RA. Upon receiving the request, the CA verifies that the request is complete, creates the certificate, and sends an email to the user confirming creation of the certificate. The user is allowed to download and store the certificate, including only the public key, on the computer disk.

The certificate is managed over its life span, for example, via the LDAP directory shared by the CA and the host system. Aspects of such management include, for example, re-issuing the certificate in response to a request received upon notification of an approaching expiry for the certificate, sending notification of the approaching expiry for the certificate, issuing a new certificate in response to a request upon expiry of the certificate, and/or revoking the certificate according to pre-defined parameters and simultaneously removing information regarding the revoked certificate from a user access definition within the LDAP directory shared by the CA and the host system.

The user is allowed to utilize the certificate stored within the microcomputer of the integrated chip card to access an application on the host server, such that when the user accesses the application on the server, the application requires that the card and certificate are present for authentication of the user. With respect to the certificate stored on the computer disk, an external system is allowed to access the application on the host server utilizing the certificate and associated keys stored on the disk of the computer of the external system for authentication of itself to the host server. With regard to the certificate stored on the HSM, the external system is allowed to access the application on the host server utilizing the certificate and associated keys stored on the HSM. In this regard, the HSM stores encryption keys and encrypts information passed into the HSM and passes the encrypted information out of the HSM. The HSM is associated with a computer of the external system and allows the external system to authenticate itself to the host server.

In another embodiment of the invention, the aspect in which the certificate is stored on the microcomputer of the smart card involves, for example, initializing the card and creating a card data list. An initial Personal Identification Number (PIN) is placed on the card, and the card is prepared for receiving a Public Key Infrastructure (PKI) certificate using authentication and digital signature smart card client software. In addition, pre-selected card initialization data for the initialized card is captured by a card data list utility. An account request file related to an access request for a new card user account is created in response to receipt of the access request. The account request file is converted to an LDAP file and imported into an LDAP system to create an account for a pre-authorized card user, and a certificate account list is created. In addition, a one-time-use PIN is produced for use as authorization to a RA certificate website when performing a download of the certificate for the pre-authorized card user.

In this aspect, the RA certificate web site is accessed from a browser of an issuing workstation, and the PKI certificate to enable the approved user to login to the host system is downloaded for the approved user to the initialized card using the browser and client software. User Identification (UID), password, and PIN information are compared by the RA with information stored in the LDAP system, and if the UID, password, and PIN information match the UID, password, and PIN information stored in the LDAP database, the request is automatically approved and the certificate is sent to the CA by the RA for signing. Thereafter, the signed certificate is sent to the issuing workstation by the CA via the RA.

In an aspect of this embodiment in which the certificate is stored on either the computer disk of the computing device or the HSM associated with the computing device, an account request file related to an access request for a new external system user is received, the account request file is converted to an LDAP file and imported into the LDAP system to create an account for the new system user, and a system account list is created. Upon receiving a server certificate request for the new system user, the certificate request is verified against the system account list and published to the LDAP. The new system user is allowed to log into the RA certificate website and import the server certificate signed by a root CA into a file-based certificate database. A generated private key and the certificate containing the public key and root CA certificate are imported into the file-based certificate database. The certificate and root CA certificate are stored on either the computer disk or external system. In this embodiment, the certificate is managed over its life span at least partly via the LDAP directory shared by the CA.

In this embodiment, the user at a client terminal is allowed to access the host system using the certificate for public key-based authentication to an application on the host server. A host system certificate is sent back to the client terminal by the host system with a request for the client certificate. The client terminal confirms that the host system certificate presented was issued by a trusted CA, and if so, sends the client certificate to the host system. The host system confirms that the client certificate was issued by a trusted CA, and if so, a user ID is extracted from the client certificate and a request for the stored client certificate is sent to the host system LDAP. The host system LDAP confirms that the client certificate is not revoked, and if not, fetches and returns a copy of the client certificate to the host system. The client certificate is compared with the copy of the client certificate, and if a match is found, the user at the client terminal is permitted to access the host system.

Additional objects, advantages and novel features of the invention will be set forth in part in the description which follows, and in part will become more apparent to those skilled in the art upon examination of the following, or may be learned by practice of the invention.

BRIEF DESCRIPTION OF THE DRAWINGS

FIG. 4 is a flow chart which illustrates an overview example of the process of creating and distributing a certificate for storage on a hardware storage module associated with a computer for an embodiment of the present invention;

FIG. 8 is an example of an enrollment page for certificate download for an embodiment of the present invention;

FIG. 14 illustrates an example of an 'Import CA Certificate Chain' screen for an embodiment of the invention;

FIG. 20 illustrates an example of a 'User Certificate Renewal' web page for an embodiment of the invention;

DETAILED DESCRIPTION

Referring now in detail to an embodiment of the invention, an example of which is illustrated in the accompanying drawings, an aspect of the present invention provides a method and system for combining multiple access points and utilizing certificates as an access method to a system from multiple access points. Certificates and public technology are prevalent and existent within the industry today. Certificate-based access to systems is something that is also existent today. However, a specific deployment aspect of an embodiment of the present invention employs the certificate-based access method over multiple different types of access vehicles and manages the generation, distribution and replacement across all channels.

Figure 1:
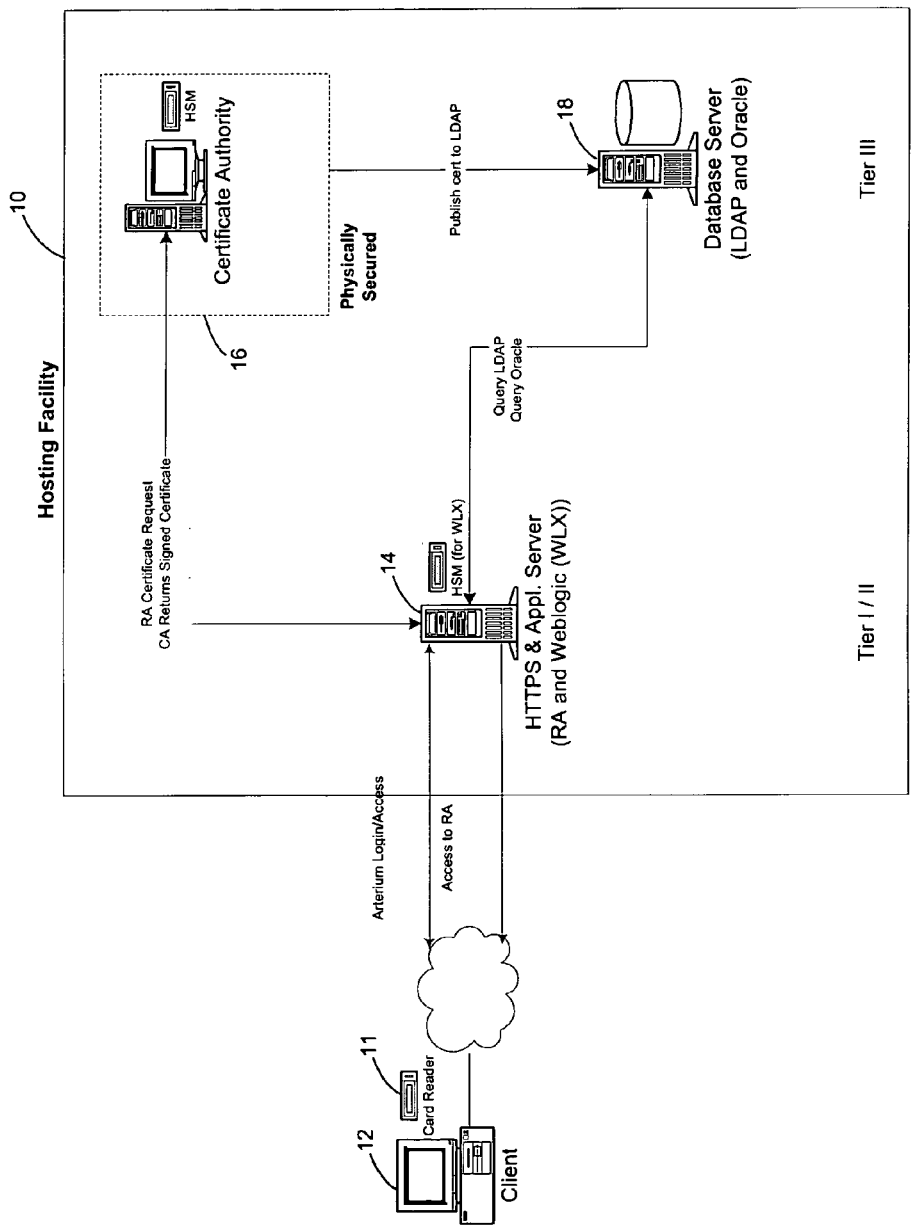
FIG. 1 is a schematic diagram that shows an example of fundamental components and the flow of information between the fundamental components for the Certificate Authority (CA)/Registration Authority (RA) facility for an embodiment of the invention.

An embodiment of the invention employs a Certificate Authority (CA)/Registration Authority (RA) facility. FIG. 1 is a schematic diagram that shows an example of fundamental components and the flow of information between the fundamental components for the CA/RA facility 10 for an embodiment of the invention. Referring to FIG. 1, fundamental components include, for example, a Client computer 12 coupled to a RA server 14, a CA server 16 coupled to the RA 14, and a Lightweight Directory Access Protocol (LDAP) server 18 coupled to both the CA 16 and the RA 14. For clarification and convenience, the following is a list of acronyms used herein.

Figure 2:
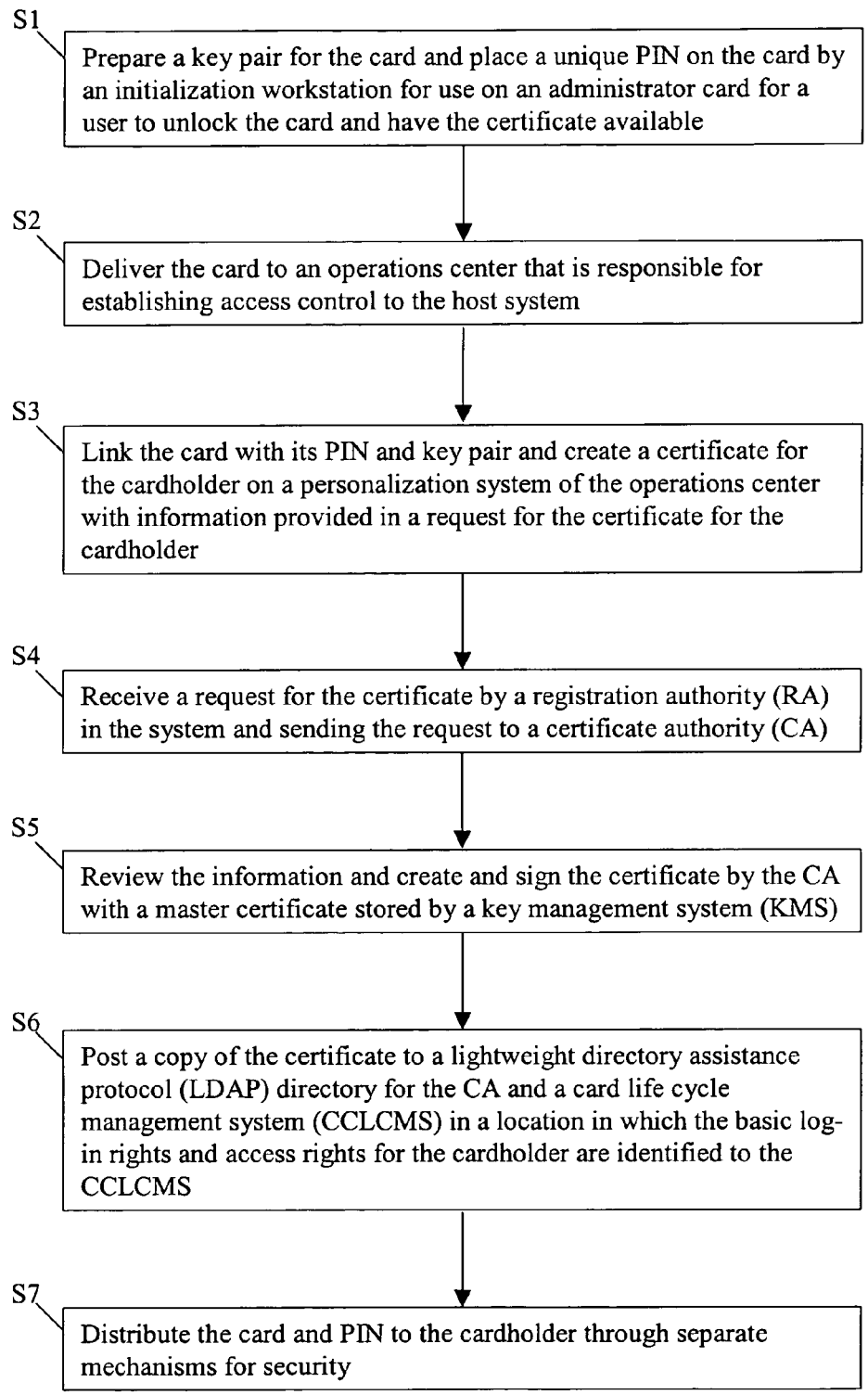
FIG. 2 is a flow chart which illustrates an overview example of the process of creating and distributing a certificate for storage on the microcomputer of an integrated chip card for an embodiment of the present invention.

CDL—Card Data List
LDAP—Lightweight Directory Access Protocol
LCMS—Lifecycle Management System
SSL—Secure Sockets Layer
CA/RA—Certificate Authority/Registration Authority
PKI—Public Key Infrastructure
LDIF—Lightweight Directory Input File
PCL—PIN Creation List
CAL—Certificate Account List
PGP—Pretty Good Privacy
PIN—Personal Identification Number
ACI—Administrator Card Issuing
UID—User ID
HSM—Hardware Security Module
CSR—Customer Service Representative
XML—Extended Markup Language
CMS—Certificate Management System
ARF—Account Request File
ACL—Activated Card List
SAL—System Account List
FQDN—Fully Qualified Domain Name In a cards aspect of the invention, users are able to utilize a certificate that is stored within a smart card, and when they need to access the host system, through a browser, the user accesses the application on the server, and the application requires that the card and certificate be present for authentication of the individual user. FIG. 2 illustrates an overview example of the process of creating and distributing a certificate for storage on the microcomputer of an integrated chip card, also known as a smart card, for an embodiment of the invention. Referring to FIG. 2, at S1, a key pair is prepared for the card and a unique Personal Identification Number (PIN) is placed on the card by an initialization workstation for use on an administrator card for a user to unlock the card and have the certificate available. At S2, the card is delivered to an operations center that is responsible for establishing access control to the host system.

Figure 3:
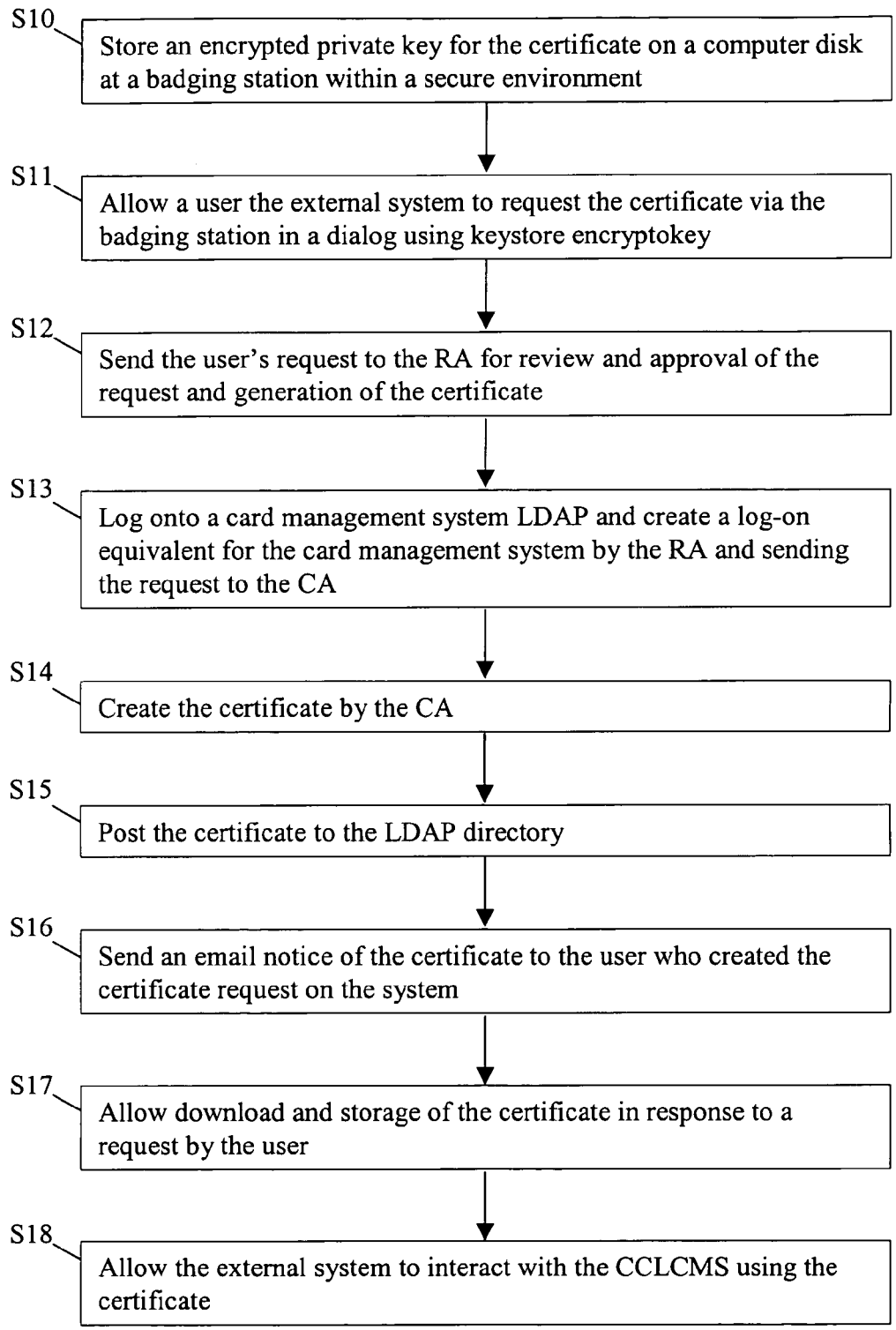
FIG. 3 is a flow chart which illustrates an overview example of the process of creating and distributing a certificate for storage on a computer disk in a secure environment for an embodiment of the present invention.

Referring further to FIG. 2, at S3, the card is linked with its PIN and key pair and a certificate is created for the cardholder on a personalization system of the operations center with information provided in a request for the certificate for the cardholder. At S4, a request for the certificate is received by the RA 14 in the system and sent to the CA 16. At S5, the information is reviewed and the certificate is created and signed by the CA 16 with a master certificate stored by a Certificate Management System (CMS). At S6, a copy of the certificate is posted to the LDAP directory 18 for the CA 16 and Lifecycle Management System (LCMS) in a location in which the basic log-in rights and access rights for the cardholder are identified to the LCMS. At S7, the card and PIN are distributed to the cardholder through separate mechanisms for security In addition, in another aspect of the invention, other systems have rights to access the host system, also providing updated information. Both systems require the same level of access control, which means a public key-based authentication. In order to accomplish that, certificates stored on the system are also used. The storage mechanism is twofold. In certain systems which are in secure locations, what is called soft storage is allowed, which means that the certificates and the keys associated with a particular certificate are stored on the disk on the system. FIG. 3 illustrates an overview example of the process of creating and distributing a certificate for storage on a computer disk in a secure environment for an embodiment of the invention. Referring to FIG. 3, at S10, an encrypted private key for the certificate is stored on a computer disk at a badging station within a secure environment, and at S11, a user on the external system is allowed to request the certificate via the badging station in a dialog using, for example, KEYSTORE CRYPTOKEY.

Referring further to FIG. 3, at S12, the user's request is sent to the RA 14 for review and approval of the request and generation of the certificate, and at S13, the RA 14 logs onto the card management system LDAP 18 and creates a log-on equivalent for the card management system and sends the request to the CA 16. At S14, the CA 16 creates the certificate; at S15 the CA 16 posts the certificate to the LDAP directory 18; and at S16, an email notice of the certificate is sent to the user who created the certificate request on the system. At S17, the user is allowed to download and store the certificate in response to a request, and at S18, the external system is allowed to interact with the LCMS using the certificate The other storage method is storage of the private key or certificate on a Hardware Security Module (HSM). The HSM is a physical component or card or external box attached to a computer that securely stores encryption keys and securely encrypts information by passing information into the module encrypting it, and then passing the encrypted information out. By doing that, the keys are never externally viewed or accessible. FIG. 4 illustrates an overview example of the process of creating and distributing a certificate for storage on a HSM associated with a computer for an embodiment of the present invention. Referring to FIG. 4, at S20, a certificate is created for an external system via a personalization portal that interacts with the LCMS providing updates and changes to data that is maintained within the LCMS.

Referring further to FIG. 4, at S21, the private key for the system is stored on the HSM, and at S22, the HSM creates a key pair in response to a request, stores a private key of the key pair, and delivers only a public key of the key pair external to the HSM. At S23, the public key is sent with request information to the RA 14 for review and approval. At S24, an entry is created in the LDAP 18 for the user who created the certificate request on the system and send the request to the CA 16 by the RA 14. At S25, the request is received by the CA 16, which verifies that the request is complete, creates the certificate, and sends an email to the user confirming creation of the certificate. At S26, download and storage of the certificate, including only the public key on a computer disk, is allowed in response to a request by the user An embodiment of the present invention provides access to the entire system using certificates and populating the certificates across multiple, different storage mechanisms. This multiplicity of storage mechanisms is an important aspect of an embodiment of the present invention. Another important aspect is the manner in which the system manages the creation and distribution of those certificates across the three different storage methods. An additional important aspect is the way in which the system manages the certificates over the life span of the certificate. Further important aspects include, for example, how the system deals with re-issuance and revocation of certificates and how the system manages certificates across these multiple methods.

In an embodiment of the present invention, different solutions are implemented to create the certificate. One method involves creating certificates for a card where an individual can interact with the card and load certificates, for example, by requesting certificates and getting them approved. In dealing with systems that require receiving certificates, there are different requirements for certificate generation. The system for an embodiment of the present invention combines both the creation and requests for certificates from systems into a single solution. While HSMs are commonly used to store key information when dealing with a host or web server environment in a network-based solution, HSMs are typically not used on the client side to store certificates. Another important aspect of the system for an embodiment of the present invention is the integration of an HSM to store the private keys on the client side system.

An additional component for an embodiment of the invention is a workstation that is used to initialize the cards. The card initializing workstation actually requests the key pair from the card, as well as putting the unique PIN on the card. A PIN is used on the administrator card for users to unlock the card and then have the card's certificate available. This is standard practice in card technology, which allows the cardholder to have something that the cardholder knows is unique about the card, that is one level of authentication. In addition, the card has the information to authenticate itself to the host system with which the card is communicating. In that way, it is possible to employ less sophisticated cryptography for the cardholder himself or herself to interact with the card and more sophisticated encryption technology when dealing with authentication, signing or establishing secure communication channels in the actual interactions with the computer or across computer networks.

In an embodiment of the present invention, the cards prepared by the initializing workstation are delivered to an operations center that is responsible for establishing the access control to the host system. Security administrators within that operations environment then receive requests for access. A list of requests for individuals having access to the system are processed through and identified, for example, in a number of ways. An operations staff member gets onto the personalization system, and with the information provided, links an individual card with its PIN and key pair and creates a certificate for the particular cardholder. That request for a certificate goes to the CA/RA system 10. Referring again to FIG. 1, the RA 14 is the system in which the Client 12 requests the certificate. The RA 14 sends that request to the CA 16. The CA 16 reviews the request to see if all of the information is there and creates and signs the certificate and then has the certificate ready to place it back on the card itself.

The CA 16 has an initial key pair that it uses to create a master certificate. That master certificate is what is used to sign the certificates that are created by the CA 16. That signature is what is used or verified to validate the authenticity of the certificate. A CMS is a separate component within the system, which is used to store master keys and then distribute them to entities. The CMS can be used in this model to be the repository of a master key for the system. It also holds master keys for many other aspects of this solution and distributes them to card vendors, to the host system, and the like, so that other aspects of cards not related to this portion of the process can be manipulated.

In an embodiment of the present invention, a certificate is created and signed, and then the card is put into a personalization workstation, and the certificate is downloaded back to that part. In addition, when that is done, the CA 16 is linked with another technology component within the CA/RA host environment 10 which is called directory services 18. There is an LDAP directory 18 on the LCMS for both the CA 16 and the LCMS. The CA 16 posts a copy of that certificate to the LDAP directory 18 in a location in which the operator has identified the basic log-in rights and access rights for that individual to the LCMS system. Where one would typically have a log-in password type of implementation, the user is now identified by the stored certificate information instead of a log in password. Following the creation process of the card, the card is distributed out to the cardholder. The PINs for those cards are distributed through a separate mechanism for security in case the cards fall into an unauthorized party's hands. That is similar to what is done in the industry today, for example, with ATM cards or credit cards. For example, a cardholder's cash PIN for a credit card comes as a separate mailing from the card itself, which gives the users rights to the system.

Continuing with the card creation process for an embodiment of the present invention, other modes of creating certificates for systems are the badging station and the personalization portal, which are examples of systems that interact with the LCMS providing updates and changes to data that is maintained within the system. It is deemed prudent when use is made of external systems that interact with a host over the Internet, to require the same level of security that is provided for individual users that have update rights to the system. Those systems are required to use certificate based authentication and secure channel communications, utilizing those same certificates to identify themselves, to establish the communication, and then to pass the information securely across the Internet. To do that, an embodiment of the present invention includes, for example, methods for storing keys, requesting a certificate, and storing the certificate on the system.

The badging stations for an embodiment of the present invention are held, for example, in secure offices within the security structure of a corporation. Those offices are deemed to be secure locations and can have the certificates stored simply on a computer disk. The security issue with that is that the private key for the certificate, which is the identification seed (although encrypted on the disk) is still sitting on a disk, and since the content of a disk is accessible by anyone that walks into the office, there is some level of risk that the information on the disk can be compromised. However, given the structure of the environment of a secure office, there is a minimal risk involved.

To implement this in an embodiment of the present invention, referring to FIG. 1, a standard system method called KEYSTORE CRYPTOKEY is utilized to create a dialog in which a user on a system can request a certificate. That request is sent up to the RA 14, which reviews and manually approves the request and generates a certificate. When manually approving the request, the RA 14 also logs onto the LDAP 18 and creates a log-on equivalent for that system. Upon creating the certificate, the CA 16 posts the certificate to the LDAP directory 18, and an email is sent back to the user who created the certificate request on the system. The user is then able to log back on and request that the certificate be downloaded and stored using the standard certificate storage methods. The system can then interact with the LCMS system.

In this aspect of an embodiment of the present invention, the user logs onto the desktop (PC) using a traditional log-in password on the PC and has rights to operate a particular program on the particular PC based on the user's usage rights. An individual user logs in on the PC, and the certificate is utilized in conjunction with a specific program on the PC, so that the user must have rights to operate that program. Once that is in place, the user is able to create badges. During the process of creating badges, an update is provided back to the LCMS system indicating that certain badging cards have changed status. Administration for a card for an individual user has been previously mentioned in the context of a badging station, where the certificates are stored on the disk itself. The certificate is utilized by the badging program rather than by an individual user, so any user that has rights to create badges also has rights to utilize the certificate. The certificate is tied to the program.

In a third instance, the process for requesting a certificate for an embodiment of the present invention is similar, except instead of storing the certificate on a disk, the request includes HSM processing. The request says, in effect, "I am going to create my own key pair using the HSM" and requests that the HSM create a public key pair and deliver only the public key external to it. There is a private key and a public key in a public key pair, and the HSM simply creates the pair and stores the private key, so there is no external visibility whatsoever of the private key. The HSM then packages the public key with its request information and sends it up to the RA 14. The RA 14 reviews and approves the request and creates the entry in the LDAP 18 for the particular system user. The same process then occurs in which the CA 16 receives the request, verifies its completeness, creates the certificate, and then posts an email back to the operator that was attached to the request. Once that email is received, the operator goes back online and downloads the certificate, which is the signed document using the CA's key pair, but only includes the public key.

That information is then deposited on the disk, but the private key in this case is always on the HSM. In today's Internet environment, HSMs are used with web servers, which is akin to the LCMS side of the equation here. However, HSMs have not been used to store a private key of the certificate on a client's side system. Referring further to the operation of the PC based, soft certificate storage, this certificate is tied to the use of a particular application. The application runs on a system that is operable continuously. It is not something that someone logs in and starts up. It provides the service unto itself. The personalization portal in the corporate badge aspect is a device that sits and runs continuously as a server to corporate cardholders to personalize the applications on the cardholder's card once the card is received by the cardholder.

The cardholder goes to a badging office for an embodiment of the present invention, and the badging office creates the card for the cardholder. The badging office also personalizes the card with some general information, photographs, and the like. However, when it comes to personalizing individual applets and services that are offered on the card, that is something that the cardholder does himself or herself. The cardholders customize the cards for themselves at their own office workstations. When they are doing that and changing the applet states on the card and actually doing the personalization, it is necessary for the system to capture changes to the card's state, so that it knows what the configuration of the card looks like at any point in time. The personalization portal runs continuously and is available for use continuously. The certificate is tied to a particular application, and whenever a request comes in to personalize a card, if it requires any verifications or validations from the LCMS system or requires updating any information on the LCMS system, the certificate is once again used to authenticate that server to the LCMS system and then to create the secure channel and secure the communication for that transaction. A minor difference in its use is that it is not the logging in by the users that is activating the application.

Certificates by their nature have an expiration date, and rationales for the expiration date are, for example, to make sure that people are still utilizing them and that those people are still authorized. If administrators change and the like, they may want to clean up the database. In connection with having certificates age off, some sort of active processing is required to maintain a user on the system. Further, encryption technology continues to change, and sophistication of users that attempt to break into systems continues to grow. Therefore, over time, one wants to make sure to use whatever is the most current encryption technology in conjunction with the certificate, such that reasonable security is being provided to the system. For those kinds of reasons, certificates age, and an embodiment of the present invention provides different methods that can be utilized within the system to reissue certificates.

One method of reissuing certificates for an embodiment of the present invention is that by an automatic process near the termination of the certificate, a notification is posted to the system, so that the next time a user with the particular certificate logs in, the user is notified that the certificate is about to expire, and the user can proactively renew the certificate. Another process is that once the certificate has expired, the user can go back to the original request page through the RA 14, and utilizing the information that is currently on the user's card, the user can request a new certificate. Given that the request is for a user that has been validated within the system, there is a certain period of time in which those requests are automatically accepted and a new certificate issued and downloaded to the card, and the LDAP directory 18 for that user is updated accordingly. Thus, there is continuous use of the system. During that time period, the user does not need to supply certificate information. It is gleaned from the expired certificates, automatically issued, and requires no RA approvals.

Another aspect of reissuance is revocation of a certificate, again primarily using mechanisms that are in place within the CA environment. When a certificate is identified as revoked, the CA 16 does certain things. One such thing is that the CA 16 has the ability to create a Certificate Revocation List (CRL), add information to that list, and post that list to the system. That is the commonly utilized method for distributing certificate revocations to a public environment. The situation for an embodiment of the present invention is different in that the CA 16 is used only to create access control authorizations for users of this system. The system has a shared LDAP directory 18 to which the CA 16 has access, as well as the host system itself.

Thus, when a certificate is revoked, the CA 16 is allowed to pull that certificate information from the user access definition within the LDAP directory 18. By doing this, if a user then attempts to log on utilizing that certificate for the system, when the LCMS system goes to verify that the certificate is the one that is issued to the user, the information is not resident in the LDAP directory 18, thereby forcing a failure to authenticate and denial of a connection. This works with both the users and the systems. As soon as the certificate is revoked, there is literally an instantaneous posting of that removal of that information from the LDAP directory 18 and therefore immediate disallowance of access to the system.

An embodiment of the present invention uses existing certificate-based authentication combined uniquely and delivering access rights or access methods for accessing the LCMS components of the system for users and systems with both soft and hard storage methods. An embodiment of the present invention provides unique methods for requesting, processing, and delivering the certificates, as well as a consistent approach for reissuance and revocation across various entities. Another important aspect is the actual request process for the client side systems that includes an HSM.

The following is a description of aspects of a preferred embodiment of the present invention that involve issuance of administrator cards, user IDs/passwords and system user certificates to access a particular application, such as the ARTE-RIUM application developed by CARDS ETC that provides infrastructure management for smart cards, products and devices. This description details, for example, the manner of performing various steps for each of the roles involved in establishing access control for a particular host system, namely the LCMS. However, it is to be understood that the invention is not limited to access control for any particular application or system but is intended to cover access control to applications and systems in general, as well as various modifications and equivalent arrangements.

Figure 5:
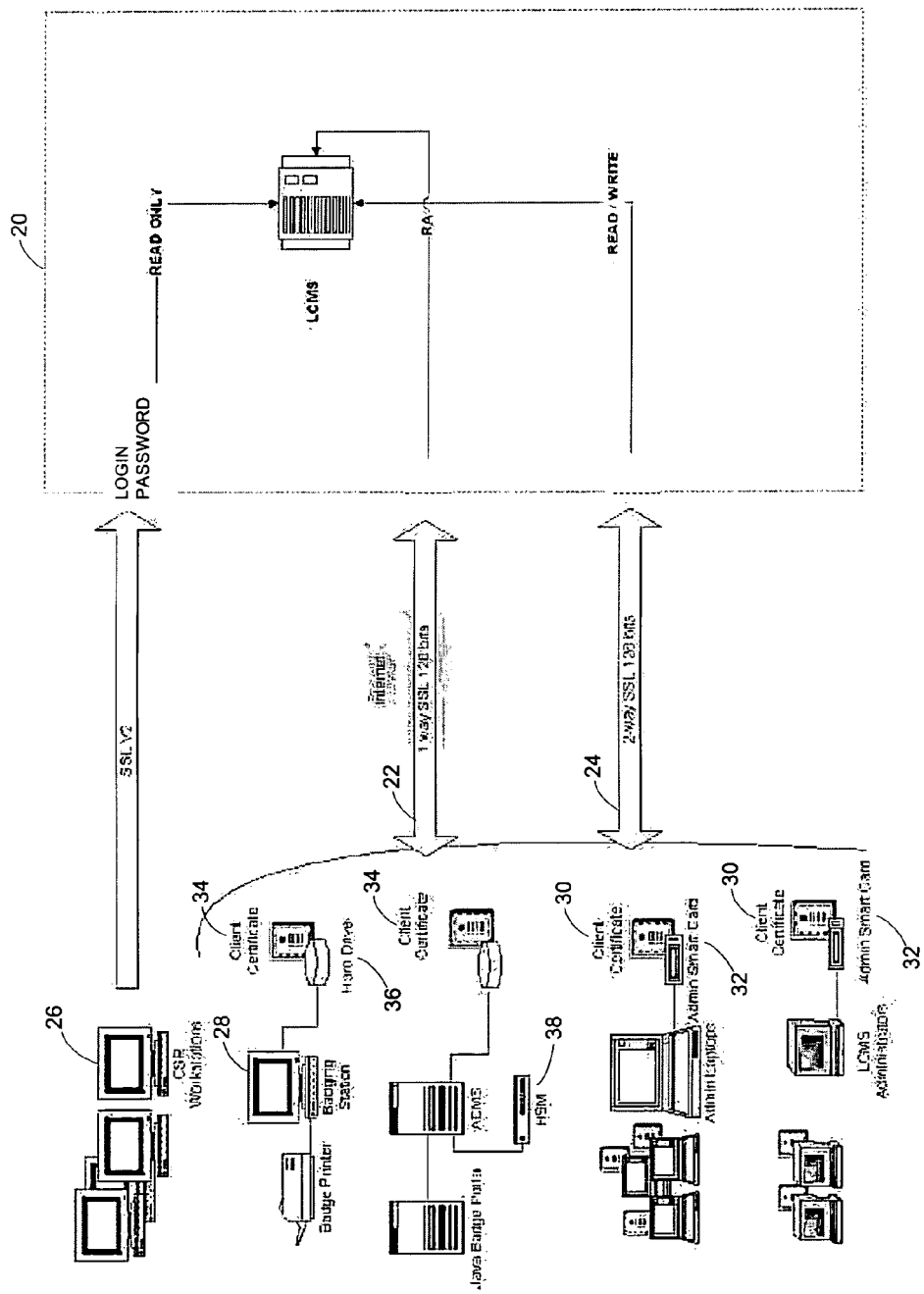
FIG. 5 is a schematic diagram that illustrates an example of different types of access to the Lifecycle Management System (LCMS) according to an embodiment of the present invention.

An embodiment of the invention employs computer software utilities to execute various functions, including, for example, a PIN Generation Utility, such as NETSCAPE CMS, Lightweight Directory Input File (LDIF) Utility, Card Data List (CDL) Utility, CertCheck.pl, Pretty Good Privacy (PGP), and Perl, a stable, cross platform programming language. FIG. 5 is a schematic diagram that illustrates an example of different types of access to the LCMS 20 according to an embodiment of the present invention. Referring to FIG. 5, the particular architecture illustrated employs, for example, the NETSCAPE CMS and IPLANET Directory Server to provide the certificate-based access control to the LCMS 20, but other certificate management systems and/or LDAP platforms can be used as well. Access to the host system, referred to as the LCMS 20 in the present example, is with a user ID and password via a one-way Secure Sockets Layer (SSL) connection 22 or with a client based Public Key Infrastructure (PKI) certificate via a two-way SSL connection 24. The one-way SSL connection 22, for example, is for users with read only access to the LCMS 20. Examples of these types of users can include customer help desk or Customer Service Representative (CSR) workstations 26. The two-way SSL connection 24, for example, is for users or systems that have write access to the LCMS 20. Examples of these types of users can include customer security officers or badging systems 28. Individual user client certificates 30 are stored on an LCMS administrator smart cards 32 issued, for example, by the entity that maintains the host system. System user client certificates 34 are stored on the system's hard drive 36 or HSM 38, depending on what the system can support.

Figure 6:
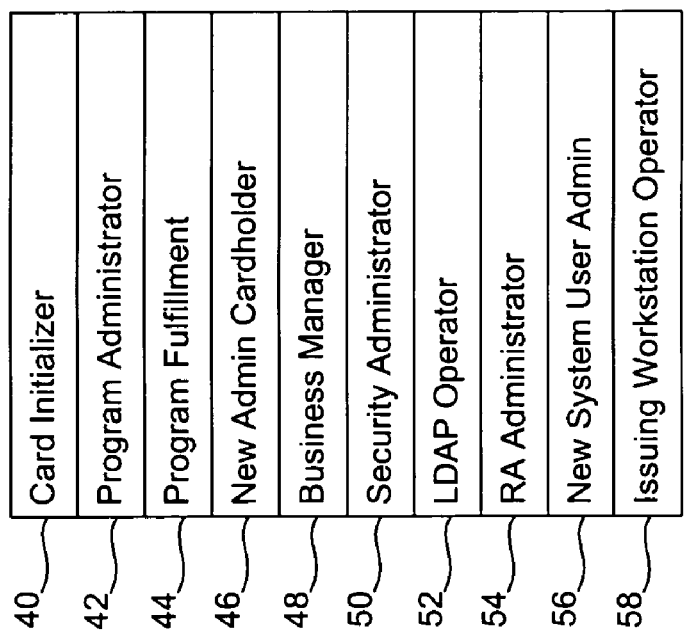
FIG. 6 is a table that shows examples of the entity roles for an embodiment of the invention.

In an embodiment of the invention, various roles and responsibilities are involved in requesting, granting and using access to the host system. FIG. 6 is a table that shows examples of the entity roles for an embodiment of the invention. Such roles include, for example, Card Initializer 40, Program Administrator 42, Program Fulfillment 44, New Admin Cardholder 46, Business Manager 48, Security Administrator 50, LDAP Operator 52, RA Administrator 54, New System User Admin 56, and Issuing Workstation Operator 58. In order to be granted access to the LCMS host system 20, the user's Program Administrator 42 must submit an access request to the LCMS Business Manager 48 for review and approval. Once the request is approved, it is passed, for example, to the Security Administrator 50 and other LCMS system operators for processing. Thus, a one-way SSL connection 22 to the LCMS 20 is established, for example, by help desk representatives or CSRs 26, a two-way SSL connection 24 to the LCMS 20 can be established by those with client certificates, and there is also access to the LCMS RA 14 to request and retrieve new client certificates.

Referring again to FIG. 5, clients accessing the LCMS 20 with read only privilege are required to be issued a user ID/password. For such clients, the protocol is one-way SSL 22 and does not require client authentication. Clients with this type of access include, for example, help desk officers, and others who require read only access to the host system 20. For clients accessing the LCMS 20, for example, for certificate issuance and download, the protocol is also one-way SSL 22 and client authentication is not required. The process for certificate issuance ensures that certificates are issued only to trusted entities. Clients accessing the LCMS 20 with read/write privilege on the database must have a certificate issued by the CA 16 of the LCMS 20. The protocol for clients accessing the LCMS 20 with read/write privilege on the database with a certificate is two-way SSL 24, and client authentication is required. Clients with this access include, for example, users within the entity maintaining the host system who require write access to the LCMS 20, badging officers, vendors who require access to upload files to the LCMS 20, system user accounts for servers, such as SUN's JAVA-BADGE ACTIVECARD server or HP's Application Control Management System (ACMS) that requires read/write Extensible Markup Language (XML) access to the LCMS 20, or a system user account, such as SUN's BADGINGSTATION that requires read/write XML access to the LCMS 20.

The entity roles in the LCMS access request process are dispersed, for example, across the entity maintaining the host system, and at times multiple organizations require the same role. These roles are typically performed by the organization that maintains the host system. The LCMS admin card issuing roles fall, for example, into four groups that either issue the cards or rely on the cards, namely card initialization, relying organization(s), business management, and card personalization. With regard to card initialization, the LCMS Admin Card Initializer 40 is a one-time preparatory role in which cards are initialized and card data is captured and the cards and data are sent to the Issuing Workstation Operator 58. With respect to the relying organization(s), Program Administrator 42 and Fulfillment 44 roles are specified separately to increase the security of the overall process, but it is up to the relying organization to decide whether these roles are staffed separately or not. There may be multiple relying organizations, including, but not limited to the organization maintaining the host system, its customers and vendors. The Program Administrator 42 is the overall administrator of LCMS admin cards and administrators for a relying organization, issues requests for new admin cards, and receives confirming notification of issued cards and card data. A Program Fulfillment 44 officer is the fulfillment officer at a relying organization, who receives and distributes cards appropriately. Separation of the duties of the Program Fulfillment 44 officer from those of the Program Administrator 42 provides increased security for cards and sensitive data.

The business management role for an embodiment of the invention has ultimate responsibility for and approval of requests for new LCMS administrator cards. The card personalization group of roles are preferably located at the same site with appropriate internal security mechanisms employed in the internal transmission and delivery of data and cards. One such role is that of the administrator of the card issuing process preformed at the issuing site, referred to herein as the Security Administrator 50 or the ARTERIUM Security Administrator 50, that receives and logs requests for new admin cards, confirms that the proper numbers of cards were initialized and certificates generated, and sends notification/card data to an admin card requester. The Security Administrator 50 may generate reports or other MIS to support the business management of LCMS administration and access. Another role is the LDAP Operator 52 that processes and updates new admin card data files and creates special web accounts for processing pre-authorized certificate requests. A third such role is the Issuing Workstation Operator 58 that inventories cards, accesses web accounts, generates keys and downloads certificates to the cards, and updates admin card data files. Separation of roles of the Issuing Workstation Operator 58 from those of the LDAP Operator 52 likewise provides increased security for card personalization.

An embodiment of the invention likewise employs, for example, three groups of roles in the issuance of or the reliance on user ID/passwords, namely relying organization(s), business management, and user ID/password creation. Similarly, there may be multiple relying organizations, including, but not limited to, the entity that maintains the host system, its customers, and vendors. With regard to relying organization(s), a Program Administrator 42 is the overall administrator of user ID/passwords and users for a relying organization, issues requests for new user ID/password accounts, and receives confirming information with user ID/password data. A Business Manager 48 has the ultimate responsibility for and approval of requests for new LCMS user ID/passwords.

With respect to user ID/password creation, the Security Administrator 50 and LDAP Operator 52 roles are preferably located at the same site, and internal security mechanisms are employed appropriately in the internal transmission and delivery of account data. The Security Administrator 50 is the administrator of the user ID/password issuing process performed at an issuing site and receives and logs requests for new accounts, confirms that a proper number of accounts were generated, and sends notification/account data to account requestors. The Security Administrator 50 may generate reports or other MIS to support the business management of the LCMS administration and access. The LDAP Operator 52 processes and updates account data files.

System user certificate issuing roles for an embodiment of the invention fall into three groups that either issue certificates or rely on them, namely relying organization(s), business management, and system user certificate generation. Likewise, there may be multiple relying organizations, including, but not limited to, the entity that maintains the host system, its customers and vendors. Regarding the relying organization(s) group of roles, the Program Administrator 42 is the overall administrator of LCMS system user certificates, and for a relying organization, issues requests for new system user certificates and receives confirming notification of issued certificates. The Business Manager 48 has the ultimate responsibility for and approval of requests for new LCMS system user certificates.

The system user certificate generation roles are likewise preferably located at the same site, and internal security mechanisms should be used appropriately in the internal transmission and delivery of certificate data. Such roles include, for example, the ATERIUM Security Administrator 50 for system user certificate issuing processing performed at the issuing site that receives and logs requests for new system user certificates, confirms that the proper number of system accounts were generated, and sends notification of activated accounts to the system user account requestor. The Security Administrator 50 may also generate reports or other MIS to support business management of LCMS administration and access. Another such role is the LDAP Operator 52 that processes and updates system user account data files and creates special web accounts for processing pre-authorized certificate requests. Still another such role is the RA Administrator 54 that approves new certificate requests for the LCMS 20 by comparing the requests to approved system account lists. This role may be played, for example, by the Security Administrator 50.

Figure 7:
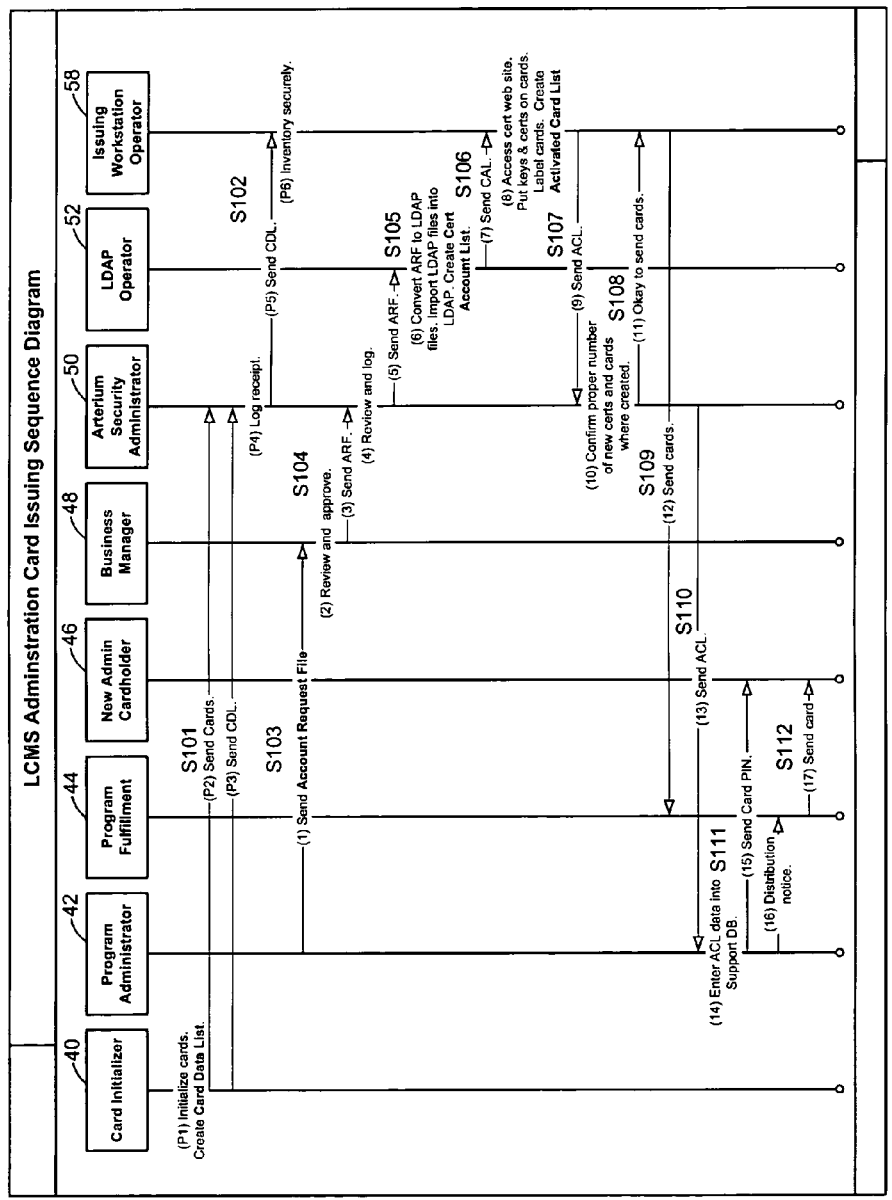
FIG. 7 is a flow chart which illustrates an example of the LCMS administration card issuance process for an embodiment of the present invention.

FIG. 7 is a flow chart which illustrates an example of the LCMS administration card issuance process for an embodiment of the present invention. Referring to FIG. 7, the utilities and programs involved in the LCMS administration card issuance process include, for example, Card Initializer 40, Program Administrator 42, Program Fulfillment 44, New Admin Cardholder 46, Business Manager 48, Security Administrator 50, LDAP Operator 52, and Issuing Workstation Operator 58. Referring again to FIG. 7, in the LCMS administration card issuance process, at S101, the Card Initializer 40 initializes the card, creates a card data list, and sends the card and card data list to the Security Administrator 50, which logs receipt and forwards the card data list to the Issuing Workstation Operator 58 at S102. At S103, the Program Administrator 42 sends an account request file to the Business Manager 48, which reviews and approves the request and forwards the account request file to the Security Manager 50 at S104. At S105, the Security Manager 50 reviews, logs, and forwards the account request file to the LDAP Operator 52, which converts the account request file to an LDAP file, imports the LDAP file into the LDAP 20, creates a certificate account list, and sends the certificate account list to the Issuing Workstation Operator 58 at S106.

Referring further to FIG. 7, at S107, the Issuing Workstation Operator 58 accesses the certificate web site, requests that the card create its key pair and prepares the certificates for the card, labels the card, creates an activated card list, and sends the activated card list to the Security Administrator 50, which confirms that a proper number of new certificates and cards were created and sends a notification to the Issuing Workstation Operator 58 that it is okay to send the card at S108. At S109, the Issuing Workstation Operator 58 sends the card to Program Fulfillment 44, and at S110, the Security Administrator 50 sends the activated card list to the Program Administrator 42. At S111, the Program Administrator 42 enters the activated card list data into a support database, sends the card PIN to New Admin Cardholder 46, and sends a distribution notice to Program Fulfillment 44. At S112, Program Fulfillment 44 sends the card to New Admin Cardholder 46.

Referring once again to FIG. 7, the card initialization process sets the initial PIN on the card and prepares the cards to have PKI certificates loaded. LCMS admin cards for an embodiment of the invention are based on a card platform, such as the SCHLUMBERGER CRYPTOFLEX 8K card platform, but any suitable card platform can be used. The card initialization process is performed using any suitable authentication and digital signature smart card client software, such as the ACTIVCARD GOLD client software, along with a card data list utility, to complete the card initialization process. The card data list utility is used to capture the initialization data for the LCMS admin cards that are initialized. The card data list utility runs on a PC workstation and is used in conjunction with the authentication and digital signature smart card client software in a process that initializes LCMS admin cards and captures selected initialization data, for example, by cutting and pasting.

Referring further to FIG. 7, upon receipt of the LCMS admin cards and associated card data list, the Security Administrator 50 notifies the Issuing Workstation Operator 58 of the receipt of the cards and logs the receipt of the cards for change control purposes. It is then the responsibility of the Issuing Workstation Operator 58 to track the inventory of cards and securely store the information until new cards need to be personalized. More particularly, in an embodiment of the invention, the Security Administrator 50 receives the card data list via signed and encrypted e-mail from the Card Initializer 40 and the initialized LCMS admin cards via shipment, verifies that the card data list information matches the card shipment by verifying it has the correct number and IDs of the cards, logs receipt of the cards and notifies the Card Initializer 40 that the information is correct, and sends the card data list to the Issuing Workstation Operator 58 via signed and encrypted e-mail and sends the cards in a separate package. Upon receipt of the cards and card data list, the Issuing Workstation 58 stores the initialized cards and card data list until ready for use. The Security Administrator 50 tracks to make sure the number of LCMS admin card requests received does not exceed the inventory of cards available, and as inventory depletes, notifies the Card Initializer 40 that more cards are required.

Referring still further to FIG. 7, the Program Administrator 42 is responsible for issuing new account requests, which can be for new LCMS admin card accounts, user ID/password accounts, or system user accounts. The Program Administrator 42 gathers the required account request data and submits the account request file via secure email to the Business Manager 48, which is responsible for reviewing and approving the access request and sending the approved request via secure e-mail to the Security Administrator 50 for processing. In an embodiment of the invention, the Program Administrator 42 generates the account request file and sends it to the Business Manager 48 using signed and encrypted e-mail, where the file is reviewed to determine if the requested access is approved and whether the file is complete and in the correct format. The Business Manager 48 informs the Program Administrator 42 of any mistakes, and the Program Administrator 42 corrects and re-submits the file, if necessary. If the format is correct, and the Business Manager 48 deems the request to be acceptable, the account request file is sent via signed and encrypted e-mail to the Security Administrator 50.

Referring once more to FIG. 7, the Business Manager 48, rather than the Security Administrator 50, is responsible for approving access requests. Receipt of the signed and encrypted account request file by the Security Administrator 50 from the Business Manager 48 means that the requests have been approved and are ready for processing. The Security Administrator 50 reviews and logs the account requests and sends the reviewed file to the LDAP Operator 52 for import into the ARTERIUM LDAP directory 18. The account request file is an abbreviated form of an LDIF file and must be converted to a full LDIF file before it can be imported into the LDAP system 18 to create accounts for pre-authorized users. A LDIF file generator utility is used to create the full LDIF file. In addition, the LDIF file generator produces a second file, which is a one-time-use PIN creation list. The one-time-use PIN is required to perform the download of the approved certificate. The LDIF file created by the LDIF file generator utility must be imported into the LDAP 18 to create the accounts for pre-authorized users.

Referring still again to FIG. 7, the card personalization step includes downloading a PKI certificate for an approved user to the initialized LCMS admin card, which allows a user to login to the LCMS 20. The personalization step begins when the certificate account list is sent to the Issuing Workstation Operator 58 by the LDAP Operator 52 and contains the account and one-time-use PIN data for accessing web-based accounts that will personalize the cards. This list shows the total number of cards that need to be created. Referring to FIG. 1, a card issuing workstation 12 is required to personalize the LCMS admin cards. The issuing workstation 12 has a smart card subsystem product installed on it, as well as a browser, such as NETSCAPE. The smart card subsystem includes software and a card reader 11. When the smart card subsystem is installed, it also adds the ability for the NETSCAPE browser to interact with smart cards. The card reader 11 and browser are used to personalize the card. The Issuing Workstation Operator 58 personalizes cards on behalf of the cardholders. It is to be noted that two "PINs" are referenced in this discussion. One such PIN is the card PIN, listed in the card data list that is used to access the LCMS admin card. The other PIN is the one-time-use PIN, listed in the certificate account list that is used as authorization to the RA website when performing a download of the certificate to a particular card. In an embodiment of the invention, the NETSCAPE browser and the ACTIVCARD client software is used on the issuing workstation 12 to complete the process to add certificates to the required LCMS admin cards. When the process is complete, an activated card list is emailed to the Security Administrator 50 for verification.

Referring once more to FIG. 7, in the card personalization process, the initialized LCMS admin cards and card data list are received by the Issuing Workstation Operator 58 from the Security Administrator 50 and stored in a secure locked location until ready to personalize the cards. Upon receipt by the Issuing Workstation Operator 58 of the certificate account list via secure e-mail from the LDAP Operator 52, the certificate account list is reviewed to determine how many cards need to be personalized, and the appropriate number of LCMS admin cards and the card data list information for those cards are retrieved from secure storage. The card data list is copied onto the issuing workstation 12 and will become the activated card list when properly edited. Thereafter, the RA web site is accessed from the NETSCAPE Browser on the issuing workstation 12, the LCMS card to be personalized is submitted into the card reader 11, and an enrollment page is displayed on the workstation monitor for the user.

Figure 8:
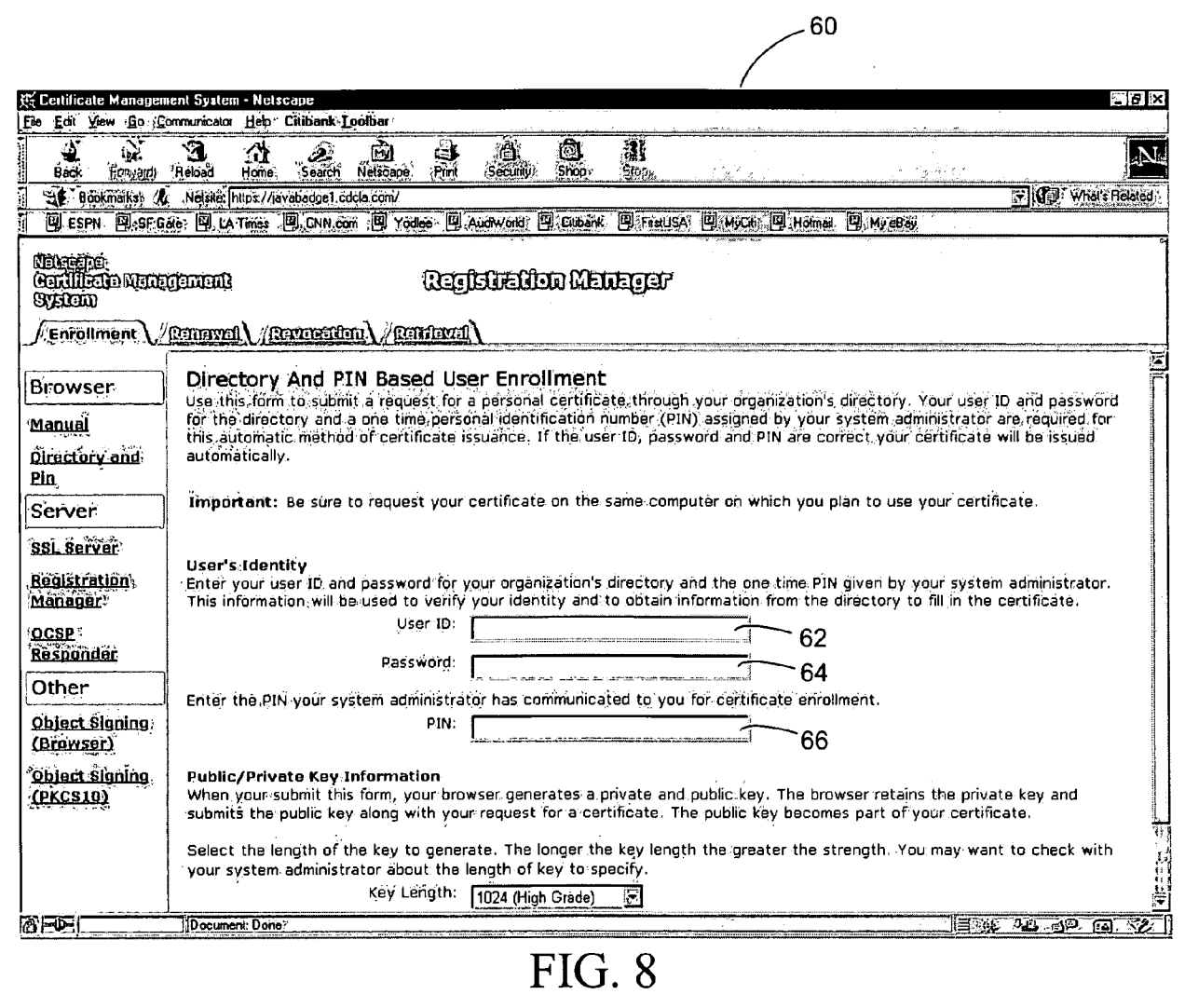
Figure 9:
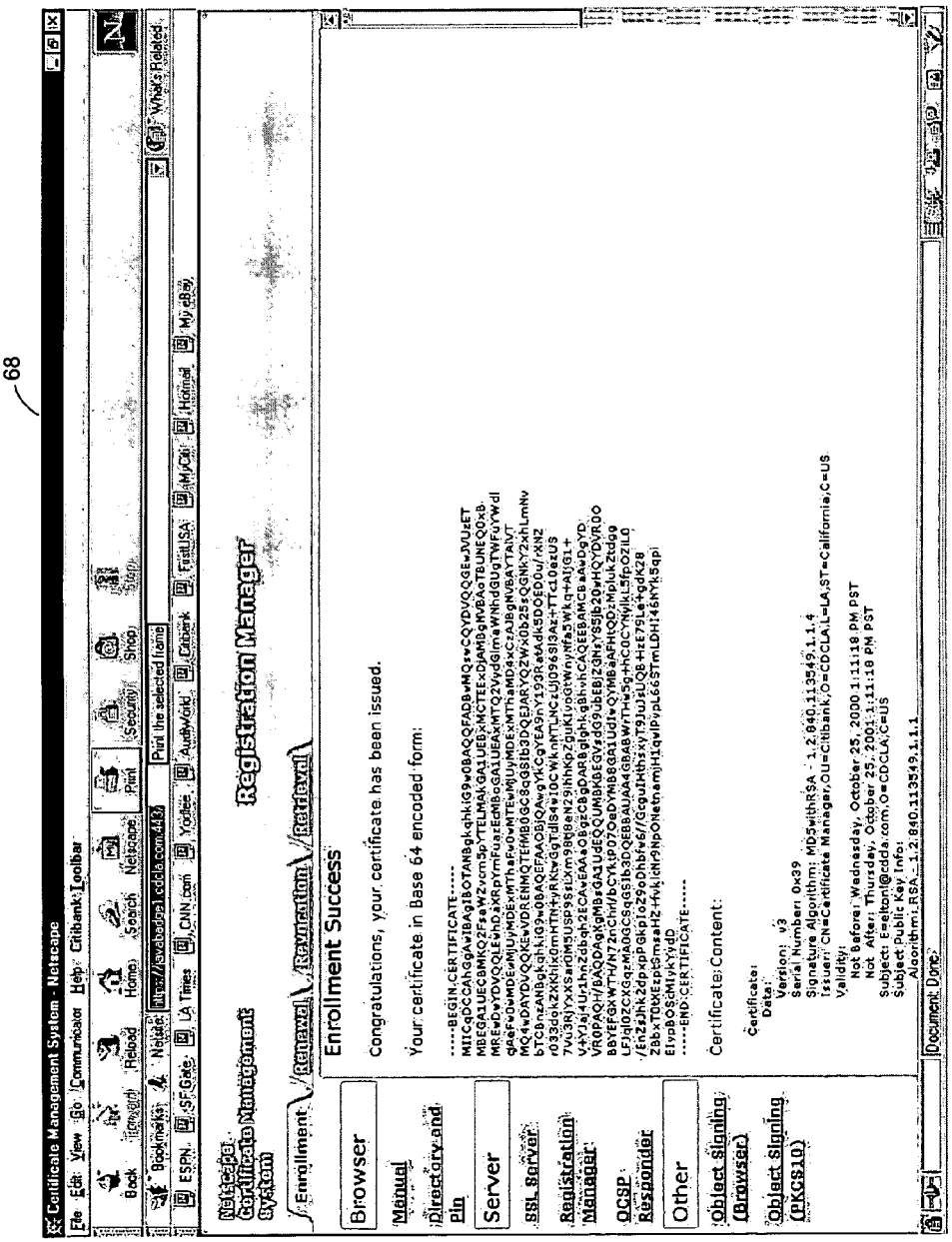
FIG. 9 shows an example of an 'Enrollment Success' screen for an embodiment of the invention.

FIG. 8 is an example of an enrollment page for certificate download for an embodiment of the present invention. At the enrollment page, the user is prompted to enter the user ID 62, password 64, and PIN 66 from the certificate account list, and after they are entered, the user clicks on 'Submit'. The user is then prompted for the original issued card PIN and can reference the card data list created previously for the card's ID number printed on the back of the card and type in the card PIN and press 'Enter'. Once this information is submitted, a key pair is generated on the card but will not be usable until a valid signed certificate is imported. After the key pair is generated, the RA 14 automatically verifies the user ID, password, and PIN information with the information stored in the LDAP database 18, and if they match, the request is automatically approved by the RA 14 and sent to the CA 16 for signing. Thereafter, the CA 16 sends the signed certificate back to the RA 14 and the detailed information is displayed to the user. At the same time, the certificate is sent to the user and automatically imported onto the card, and when the process completes, an 'Enrollment Success' screen 68 is displayed for the user, an example of which is illustrated in FIG. 9 for an embodiment of the invention.

The user's user ID associated with the card is entered into a 'Name' column of the card data list, and with this information, the file is now called the activated card list. The correct completion of the certificate download is verified by viewing the card contents, for example, via the ACTIVCARD GOLD utilities. The forgoing process is repeated for each LCMS admin card to be created, and the activated card list is sent to the Security Administrator 50 using signed and encrypted email. In the body of the e-mail the number of cards personalized and dates when the first card and last cards were personalized (if personalization took place over a number of days) is indicated and will be used to confirm that the correct number of certificates was issued.

The Security Administrator 50 performs the "checker" role of the LCMS admin card creation process. Once the Security Administrator 50 verifies that the proper number of new certificates and cards were created, clearance is given to the Issuing Workstation Operator 58 to mail the personalized LCMS admin cards to the requesting organization Program Fulfillment 44. As a separate message, the Security Administrator 50 sends the activated card list to the requesting organization Program Administrator 42. The fulfillment task for new LCMS admin cards is designed for two separate roles, namely the Program Administrator 42 and Program Fulfillment 44. Separating these duties ensures that no one person has both the physical cards, with the card PINS, before the rightful owner of the card receives it. Program Fulfillment 44 is responsible for physical card distribution, and Program Administration 42 is responsible for card PIN distribution and unlock code archival.

Figure 10:
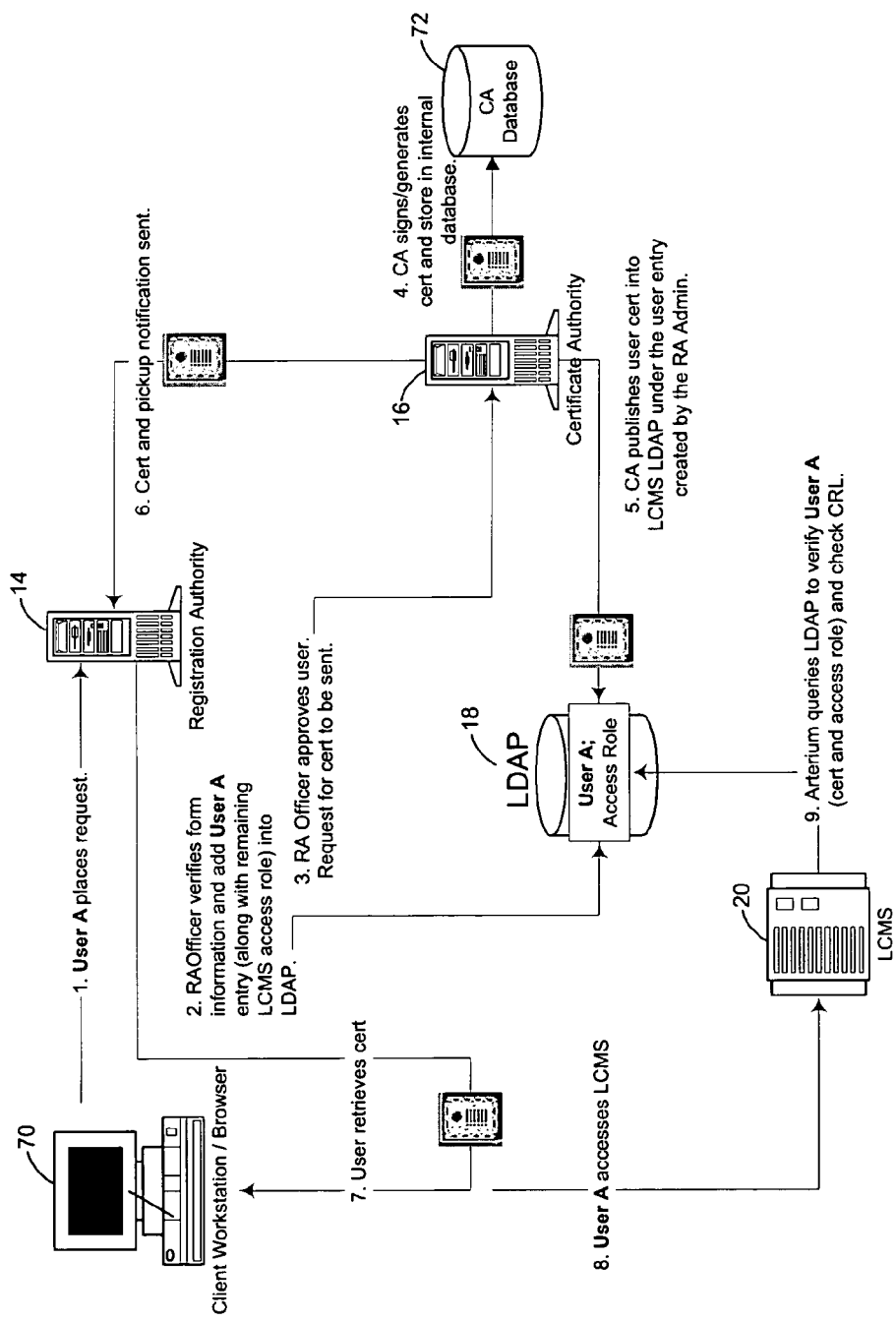
FIG. 10 is a schematic diagram that illustrates an example of fundamental components and the flow of information between the fundamental components employed in the process of the request, approval and retrieval of a system user certificate for an embodiment of the present invention.
Figure 11:
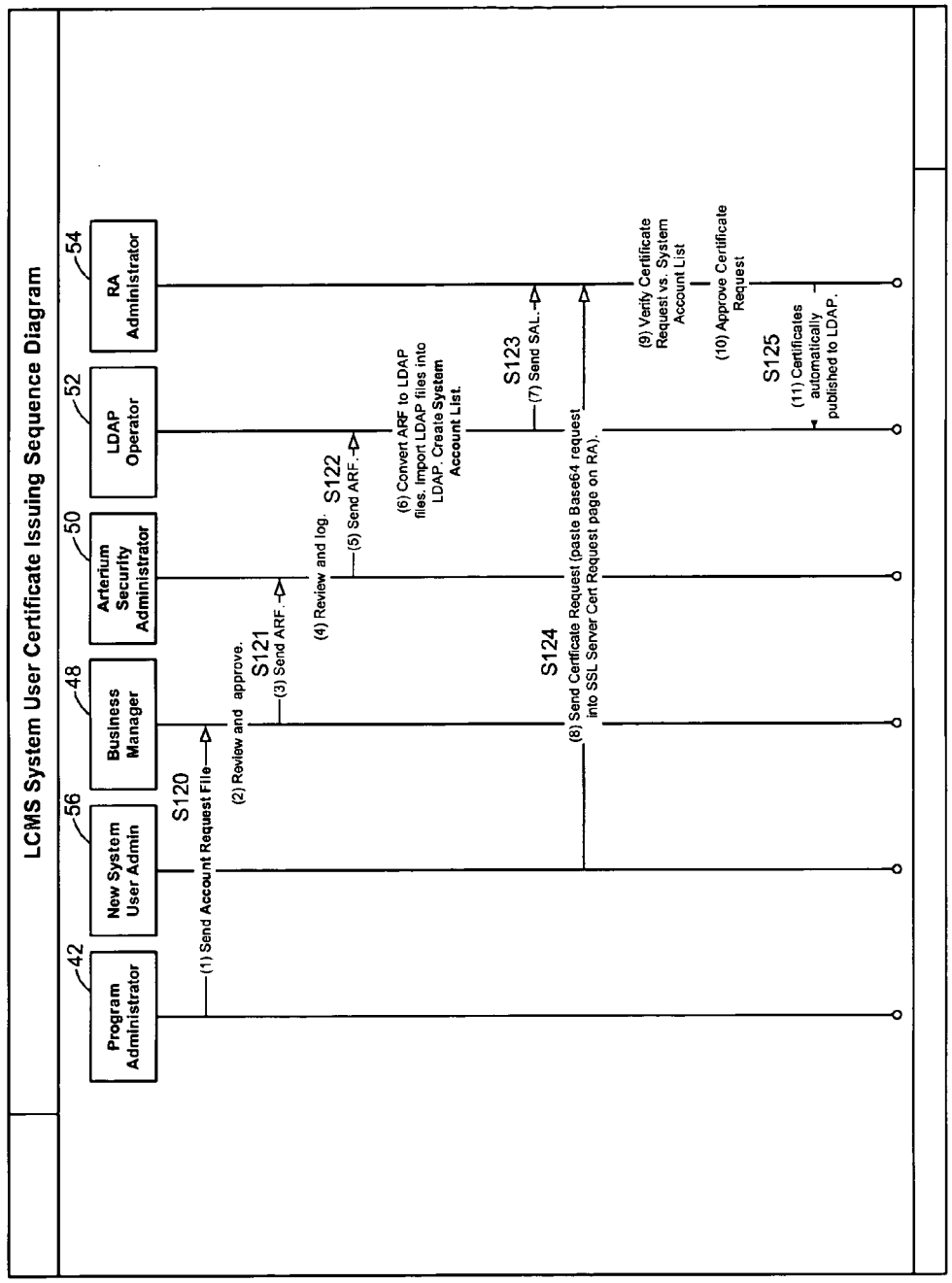
FIGS. 11 and 12 show a flow chart which illustrates an example of the LCMS system user certificate issuing process for an embodiment of the invention.
Figure 12:
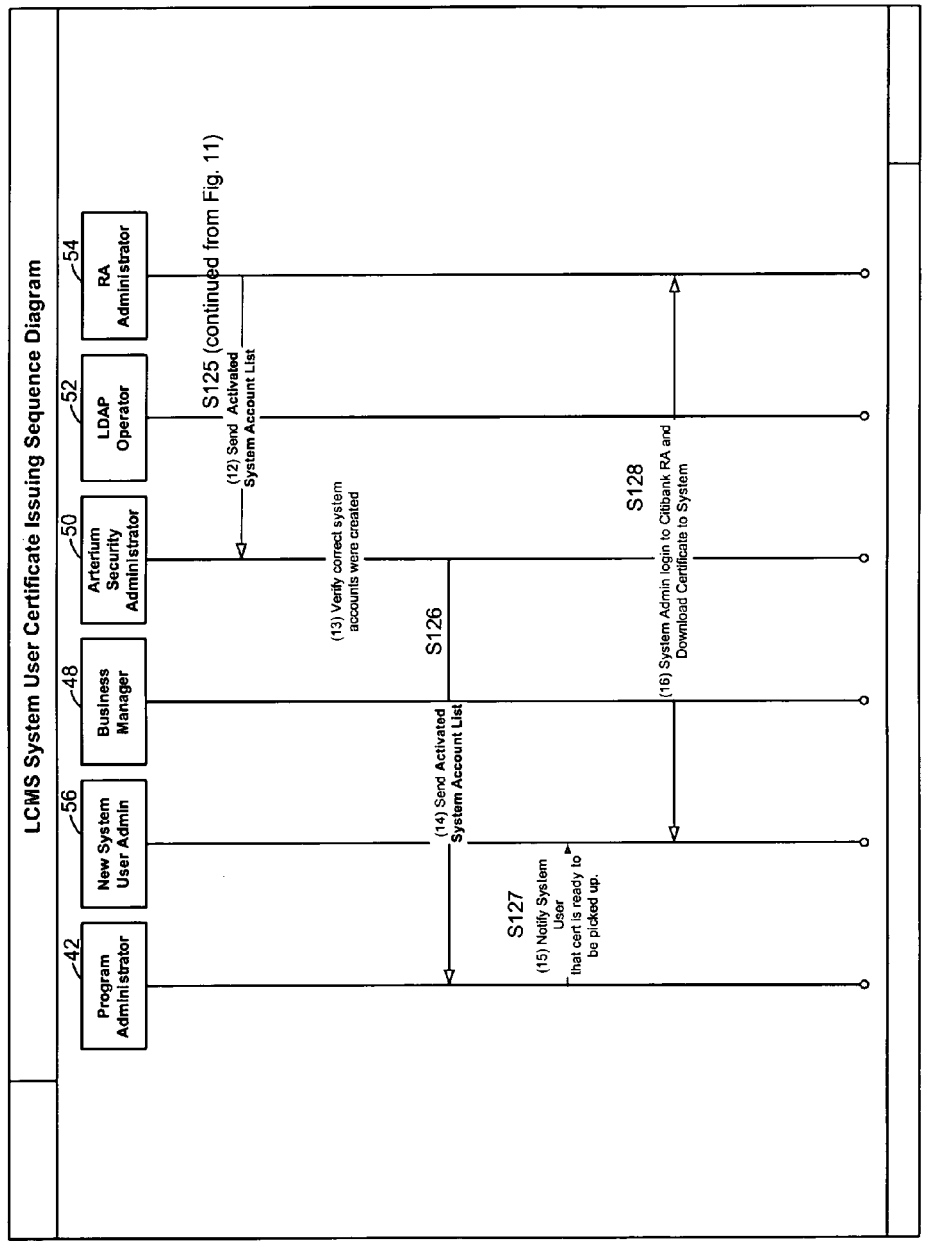

FIG. 10 is a schematic diagram that illustrates an example of fundamental components and the flow of information between the fundamental components employed in the process of the request, approval and retrieval of a system user certificate for an embodiment of the present invention. Referring to FIG. 10, fundamental components in the system user certificate process include, for example, a Client Workstation/Browser 70, the RA server 14, the CA server 16 and its CA database 72, the LDAP 18, and the LCMS 20. FIGS. 11 and 12 show a flow chart which illustrates an example of the LCMS system user certificate issuing process for an embodiment of the invention. Referring to FIGS. 11 and 12, the utilities and programs involved in the system user certificate issuing process include, for example, Program Administrator 42, New System User Admin 56, Business Manager 48, ARTERIUM Security Administrator 50, LDAP Operator 52, and RA Administrator 54. Referring again to FIGS. 11 and 12, at S120, the Program Administrator 42 sends an account request file to the Business Manager 48, which reviews, approves and sends the account request file to the Security Administrator 50 at S121. At S122, the Security Administrator 50 reviews, logs, and sends the account request file to the LDAP Operator 52, which converts the file to an LDAP file, imports the LDAP file into LDAP 18, creates a system account list, and sends the system account list to the RA Administrator 54 at S123. At S124, the New System User Admin 56 sends a certificate request to the RA Administrator 54, which verifies the certificate request against the system account list, approves the certificate request, automatically publishes the certificate to the LDAP 18, and sends an activated system account list to the Security Administrator 50 at S125. Continuing with the process in FIG. 12, at S126, the Security Administrator 50 verifies the creation of the system accounts and sends the activated system account list to the Program Administrator 42, which notifies the system user that the certificate is ready to be picked up at S127. At S128, the New System User Admin 56 logs into the RA 14 and downloads the certificate to the system.

Referring further to FIGS. 11 and 12, the Business Manager 48, rather than the Security Administrator 50, is responsible for approving access requests to the ARTERIUM application. Receipt of the signed and encrypted account request file by the Security Administrator 50 from the Business Manager 48 indicates that the requests have been approved and are ready for processing. The Security Administrator 50 reviews and logs the account requests and sends the reviewed file to the LDAP Operator 52 for import into the LDAP directory 18. The account request file is an abbreviated form of an LDIF file. The account request file must be converted to a full LDIF file before it can be imported into the LDAP system 18 to create accounts for pre-authorized users. The LDIF file generator utility is used to create the full LDIF file. The LDIF file created by the LDIF file generator utility must be imported into the LDAP 18 to create the accounts for pre-authorized users. Account request file processing for system user certificate issuance is similar to account request file processing for card issuance except, e.g., for PIN generation. Once the LDIF file is imported into the LDAP directory 18, the system user accounts are separated out from the account request file, which are those with the roles ACTIVCARD server and badging station, and saved as a separate file called the system account list. The system account list is sent to the RA Administrator 54 via signed and encrypted e-mail.

Referring again to FIGS. 11 and 12, a system user certificate is necessary to communicate with the ARTERIUM application. For example, a badging station requires a system user certificate. When the badging station prints a badge, the status of the badge changes from 'Blank' to 'Printed'. Thus, the badging station requires a server user certificate in order to communicate this change to the ARTERIUM application. The New System User Admin 56 completes the process to request and download a system user certificate from the ARTERIUM application. Referring further to FIGS. 11 and 12, the on-line certificate request step involves creation by the New System User Admin 56 of a keystore, or other form of file-based certificate database, that generates a private/public key pair within the keystore file. Once the public/private key pair has been created, the next step is to generate a server certificate request, so that the certificate can be signed by the recognized root CA 16. The contents of this file are copied to the clipboard, and the browser, such as NETSCAPE, is launched to access a "Smart Access RA Certificate Enrollment" form 70, an example of which is illustrated in FIG. 13 for an embodiment of the invention.

Figure 13:
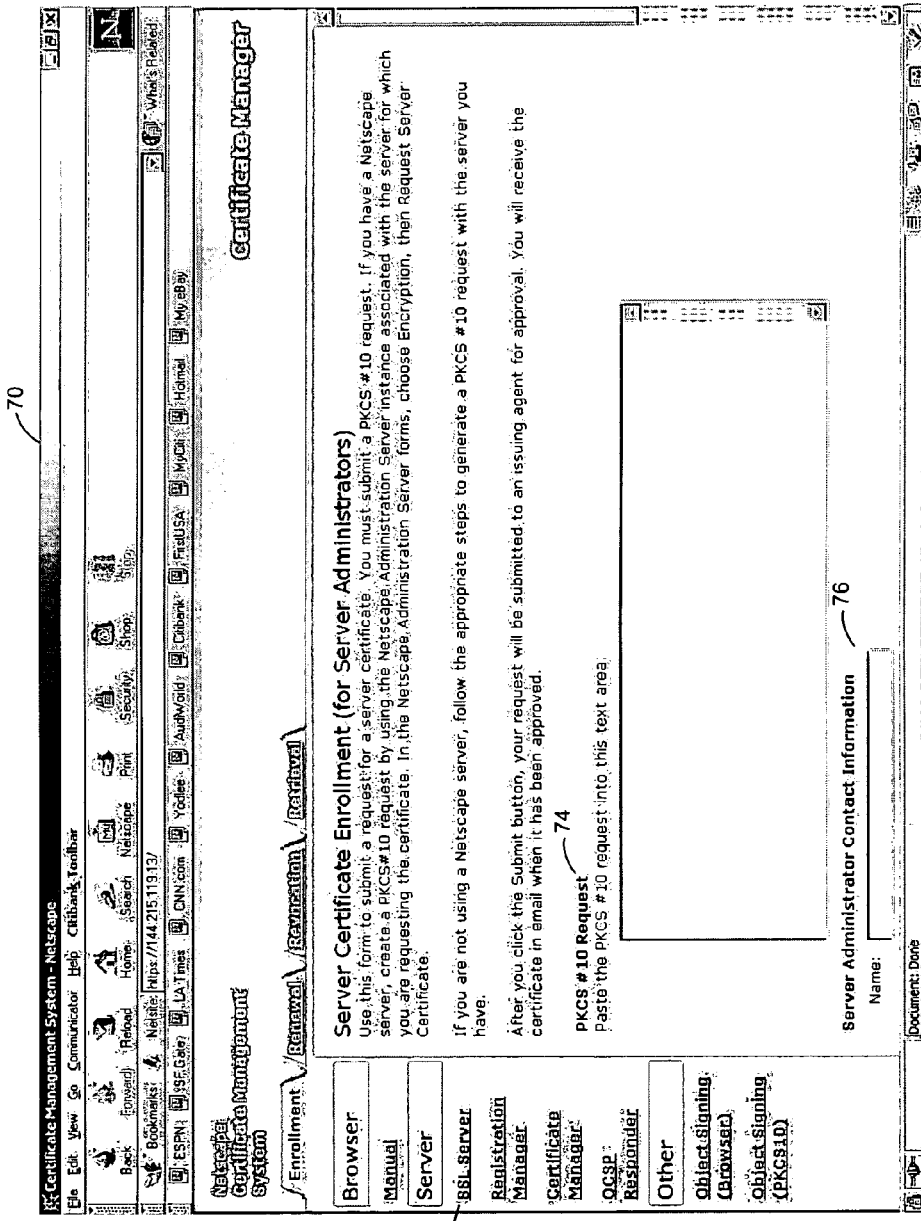
FIG. 13 shows an example of a "Smart Access RA Certificate Enrollment" form for an embodiment of the invention.
Figure 14:
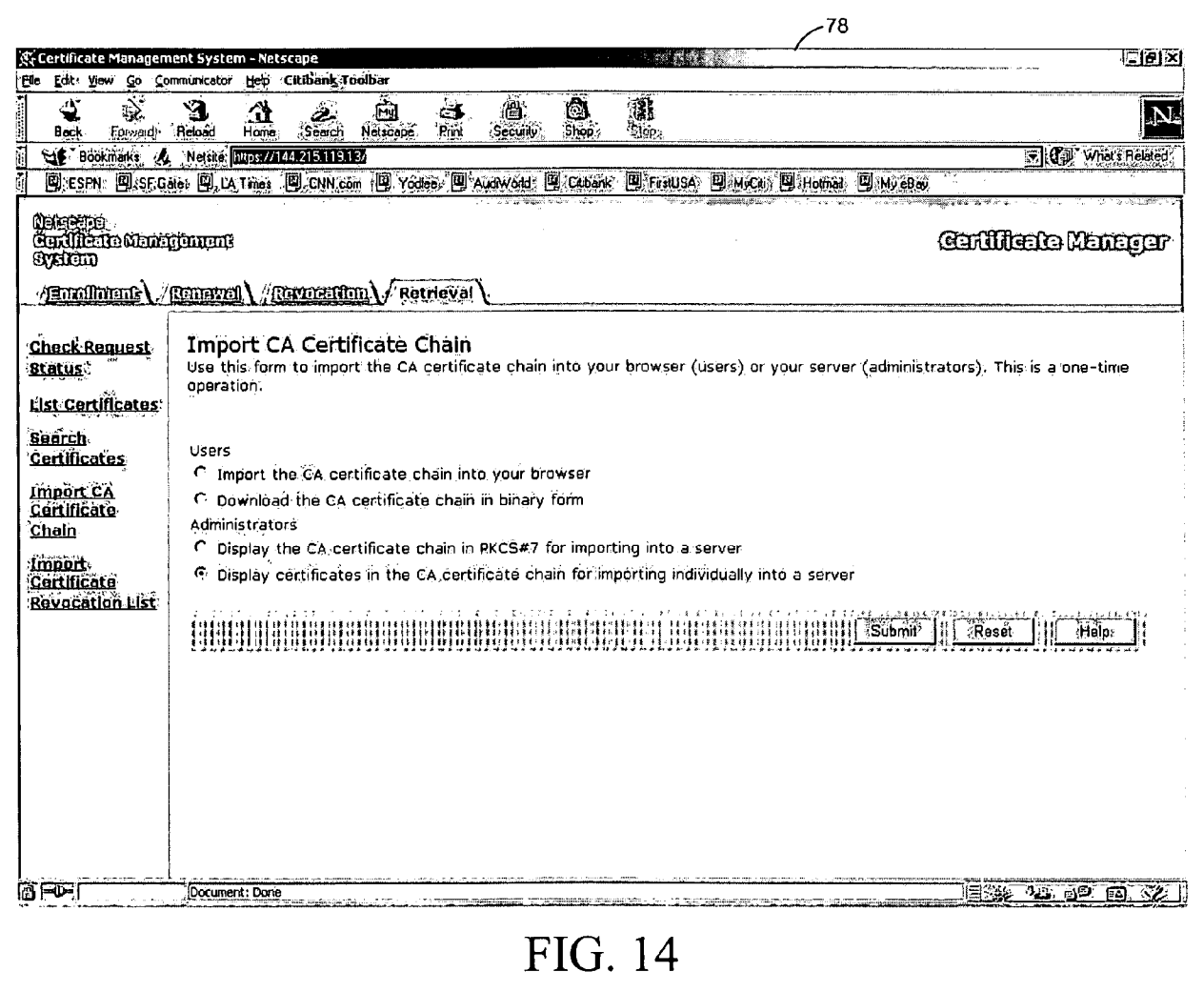
Figure 15:
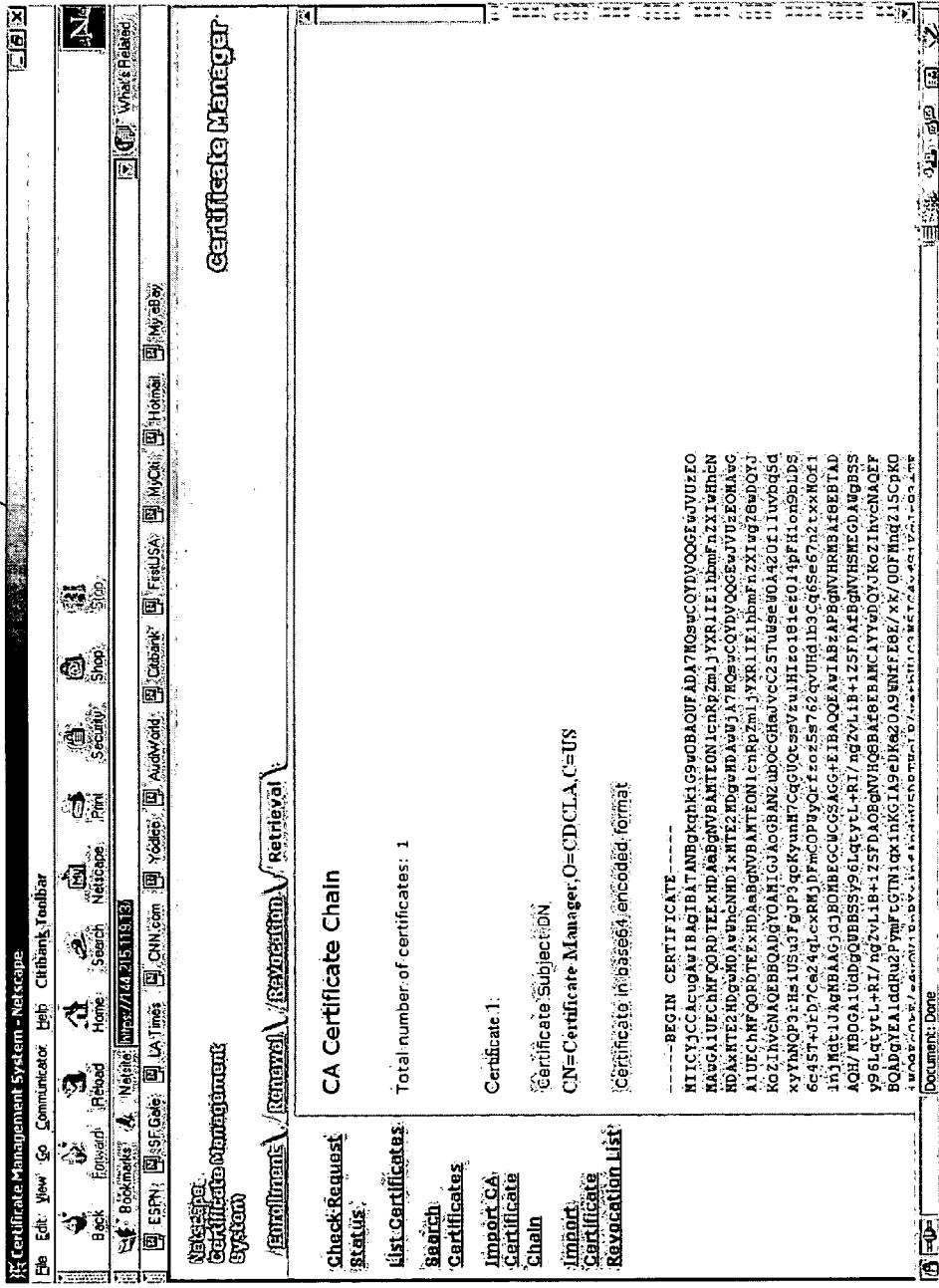
FIG. 15 illustrates an example of a 'CA Certificate Chain' screen for an embodiment of the invention.

Referring to FIG. 13, the New System User Admin 56 selects the 'SSL Server' link 72 in the left-hand frame of the enrollment form 70, pastes the copied server certificate request into the text area under 'PKCS #10 Request' 74, enters in the 'Server Administrator Contact Information' 76, including full name and email address, clicks 'Submit', and records a 'Request' ID number that is returned, which is needed when retrieving the approved certificate. Thereafter, the New System User Admin 56 ensures that the Program Administrator 42 has sent an account request file for the new system user connection, and while waiting for the certificate approval, the New System User Admin 56 imports the root CA certificate chain into the keystore file or other file-based certificate database. FIG. 14 illustrates an example of an 'Import CA Certificate Chain' screen 78, and FIG. 15 illustrates an example of a 'CA Certificate Chain' screen 80 for an embodiment of the invention.

Referring once again to FIGS. 11 and 12, at S125 in the system user certificate approval process, the RA Administrator 54 receives the system account list from the LDAP Operator 52. For new system user requests accounts, the information in this list is compared against the certificate requests that come in from the remote system administrators. If the data matches, the request is approved. The data which must be matched includes, for example, the server name provided in the certificate request and the contact information of the requestor. After the certificate request has been approved, the certificates for the system user are published to the LDAP database 18 automatically, and the activated system account list is sent to the Security Administrator 50 for verification. At S126, the Security Administrator 50 plays the "checker" role of the system user account generation process in verifying that the correct accounts were created and notifying the requesting organization Program Administrator 42 that the requested certificates are ready for download.

Figure 16:
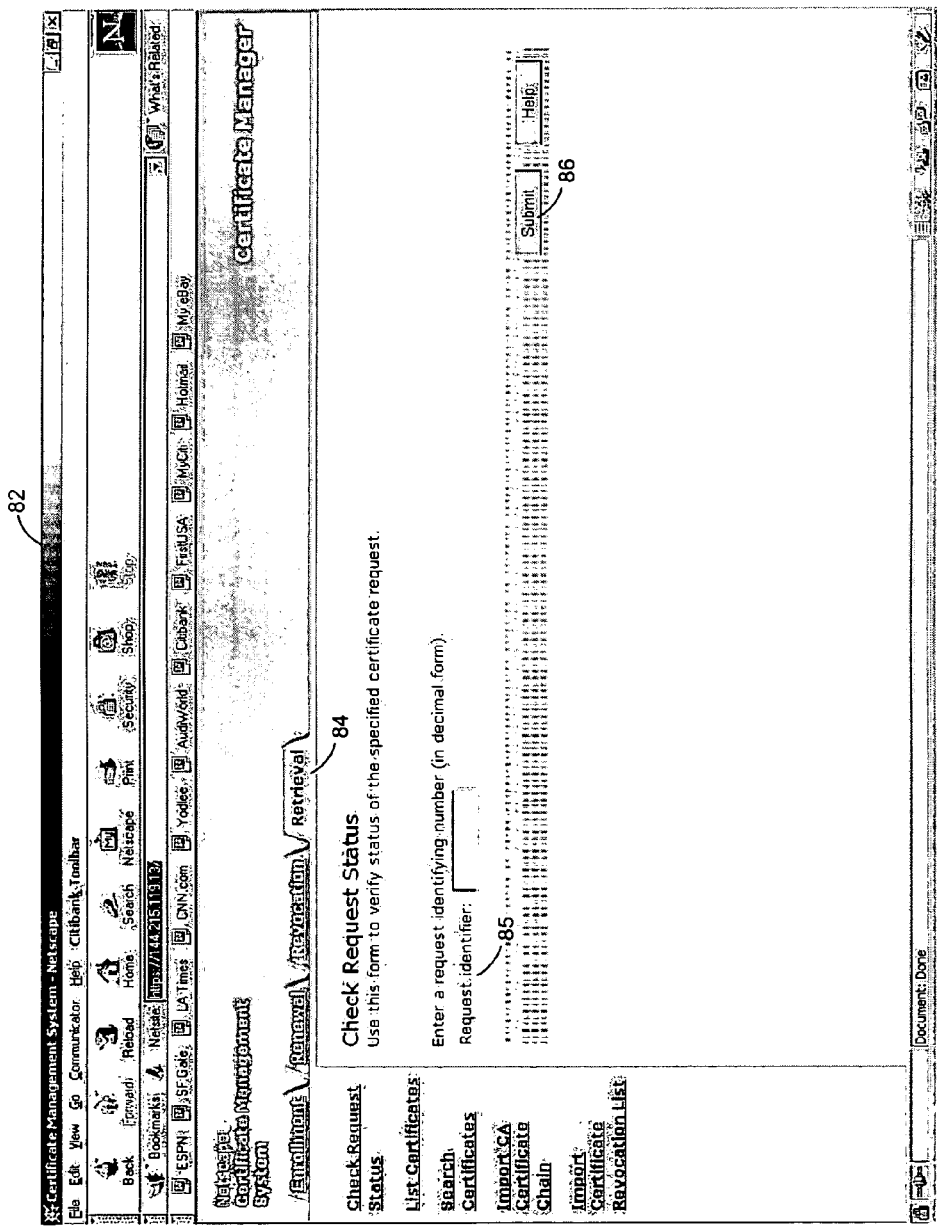
FIG. 16 shows an example of a 'Check Request Status' screen for an embodiment of the invention.
Figure 17:
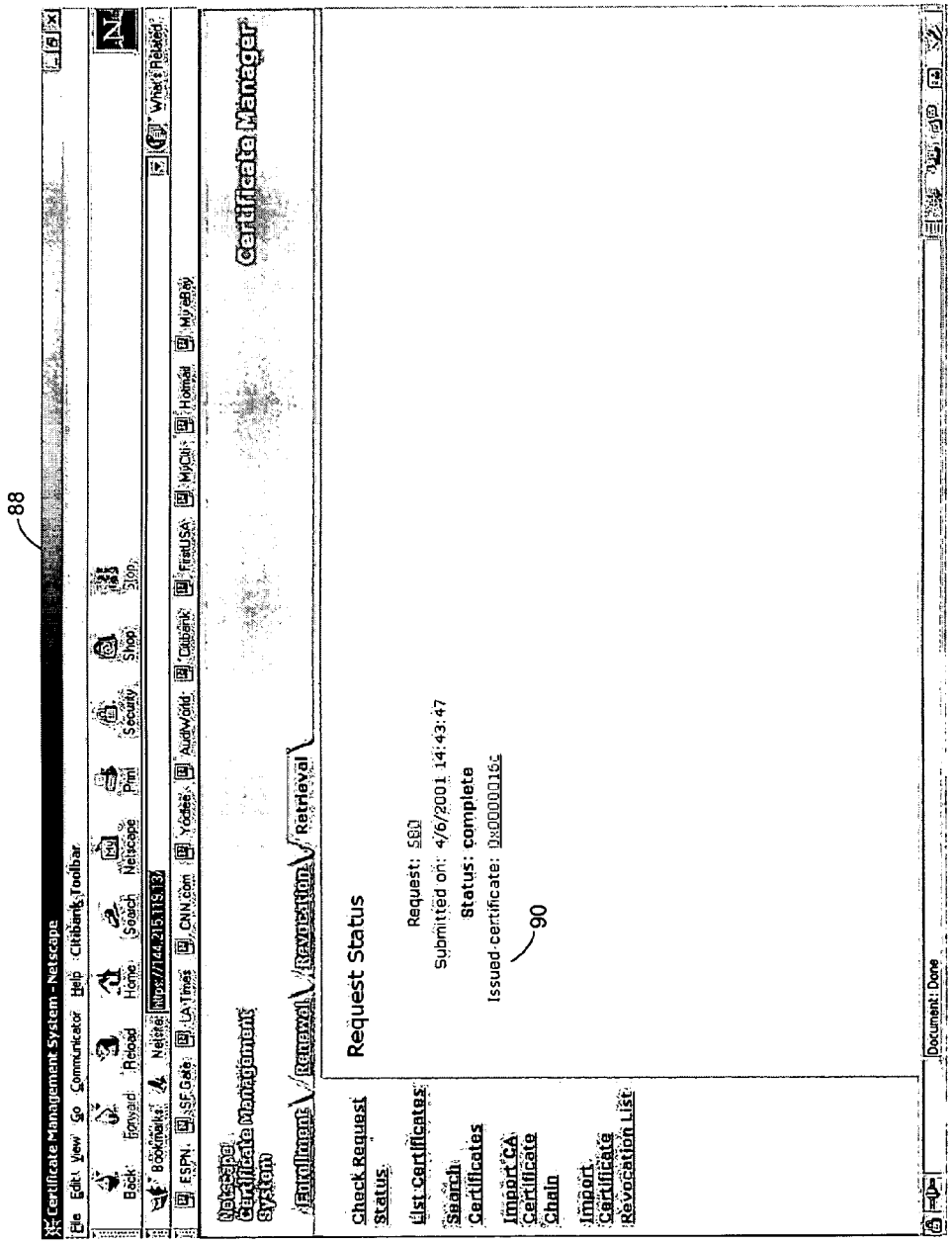
FIG. 17 shows an example of a 'Request Status' screen for an embodiment of the invention.
Figure 18:
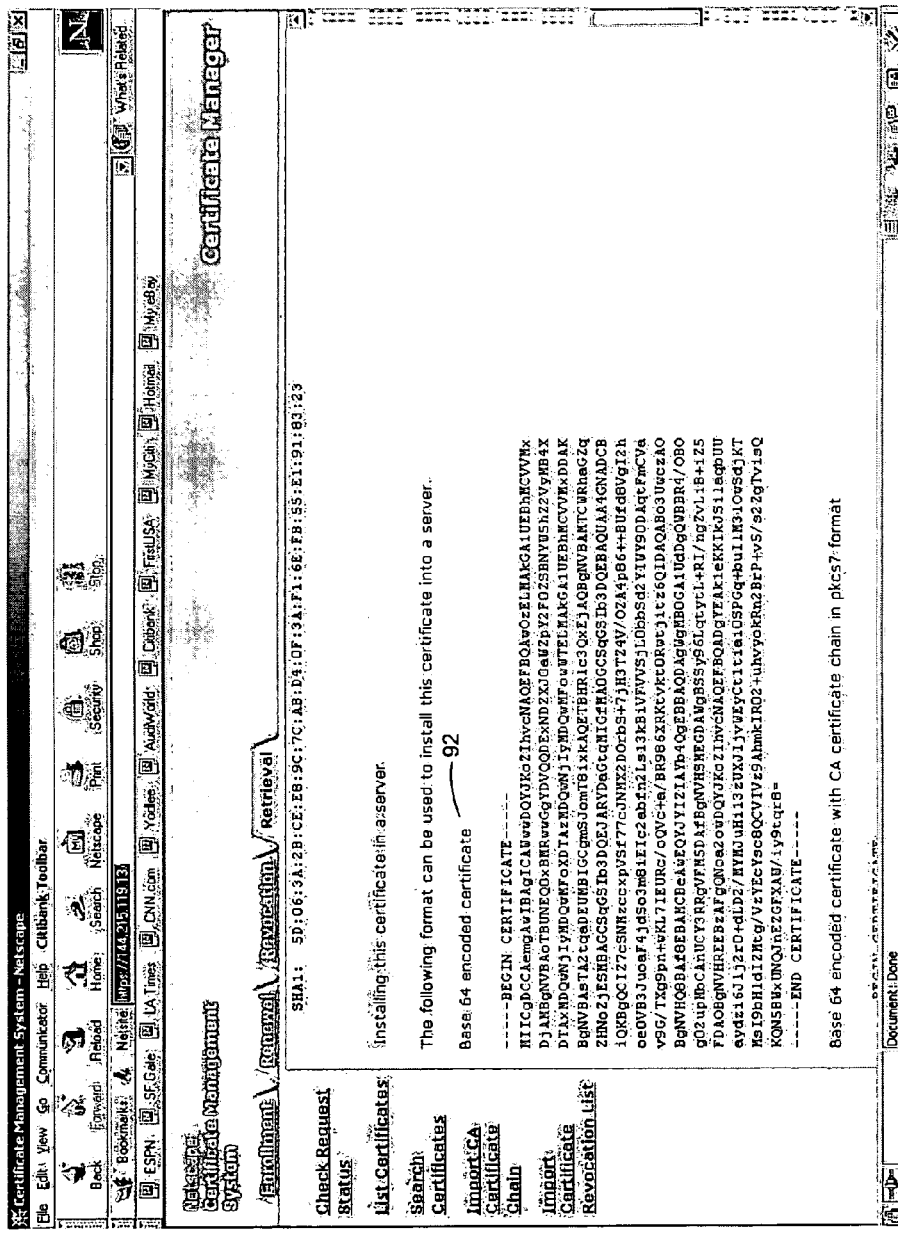
FIG. 18 shows an example the 'Base 64 encoded certificate' displayed on the 'Request Status' screen for an embodiment of the invention.

Referring once more to FIGS. 11 and 12, at S127, when the Program Administrator 42 receives notification from the Security Administrator 50 that the requested certificate is available for download, the New System User Admin 56 performs the download of the certificate to the system by returning to the RA website to retrieve the certificate. FIG. 16 shows an example of a 'Check Request Status' screen 82 for an embodiment of the invention. Referring to FIG. 16, the New System User Admin 56 clicks on a 'Retrieval' tab 84 displayed on the 'Check Request Status' screen 82, enters the request ID 84 and clicks 'Submit' 86. FIG. 17 shows an example of a 'Request Status' screen 88 for an embodiment of the invention. The certificate listing will appear on the 'Request Status' screen 88, and the New System User Admin 56 clicks on the 'Issued Certificate' serial number 90 to display the actual certificate and scrolls down to the 'Base 64 encoded certificate' 92, an example of which is illustrated in FIG. 18 for an embodiment of the invention. The New System User Admin 56 copies and pastes the entire certificate into a text file on the server and imports the server certificate signed by the root CA 16 into the keystore or other file-based certificate database using the respective utilities/commands. Once the private key has been generated and the signed public key (certificate) and root CA certificate have been imported, the keystore is ready for use with the LCMS XML messaging interface.

Figure 19:
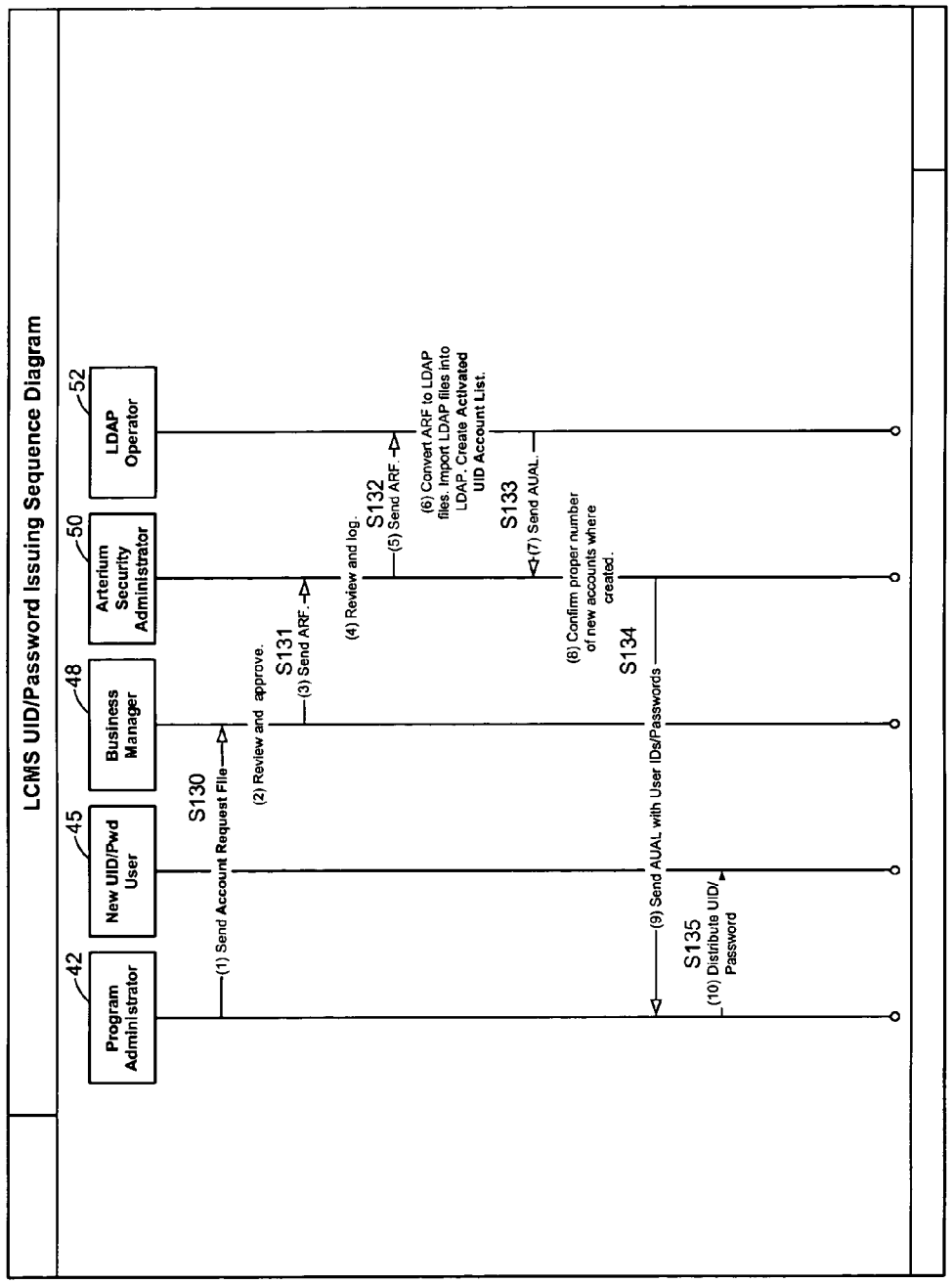
FIG. 19 is a flow chart that illustrates an example of the process of LCMS user ID/password issuance for an embodiment of the present invention.

FIG. 19 is a flow chart that illustrates an example of the process of LCMS user ID/password issuance for an embodiment of the present invention. Referring to FIG. 19, the utilities and programs involved in the LCMS user ID/password issuance process include, for example, Program Administrator 42, New User ID/Password user 45, Business Manager 48, ARTERIUM Security Administrator 50, and LDAP Operator 52. Referring further to FIG. 19, at S130, the Program Administrator 42 sends the account request file to the Business Manager 48, which reviews and approves the file and sends it to the Security Administrator 50 at S131. At S132, the Security Administrator 50 reviews and logs the account request file and sends it to the LDAP Operator 52. At S133, the LDAP Operator 52 converts the account request file to an LDAP file, imports the LDAP file into the LDAP 18, creates an activated user ID account list and sends it to the Security Administrator 50. At S134, the Security Administrator 50 confirms that the proper number of new accounts were created and sends the activated user ID account list with user IDs/passwords to the Program Administrator 42. At S135, the Program Administrator 42 distributes the user IDs/passwords to new user ID/password users 45.

Referring further to FIG. 19, the account request and approval process for user ID/password accounts at S130 and S131 is similar to the account request and approval process for LCMS admin card accounts. In account request file processing at S132 and S133, as noted, responsibility for approving access requests to the ARTERIUM application lies with the Business Manager 48 instead of the Security Administrator 50. When the Security Administrator 50 receives the signed and encrypted account request file from the Business Manager 48, it means that the requests have been approved and are ready for processing. The Security Administrator 50 reviews and logs the account requests and then sends the reviewed file to the LDAP Operator 52 for import into the LDAP directory 18. The account request file is an abbreviated form of an LDIF file and must be converted to a full LDIF file before it can be imported into the LDAP system 18 to create accounts for pre-authorized users. The LDIF file generator utility is used to create the full LDIF file, which must be imported into the LDAP 18 to create the accounts for pre-authorized users. Account request file processing for user ID/password issuance is similar to account request file processing for card issuance except, e.g., for PIN generation. Once the LDIF file is imported into the LDAP directory 18, the user ID/password user accounts are separated out from the account request file. These are the files with the roles Help Desk Officer and Hosting Admin Officer and are saved as a separate file now called the activated user ID account list. The activated user ID account list is sent to the Arterium Security Administrator 50 via signed and encrypted e-mail.

Referring further to FIG. 19, at S134, the Security Administrator 50 plays the "checker" role in the user ID/password account creation process. The Security Administrator 50 receives the activated user ID account list from the LDAP Operator 52 via signed and encrypted e-mail, verifies that the correct accounts were created and sends the activated user ID account list to the requesting organization Program Administrator 42 via signed and encrypted e-mail. At S135, the Program Administrator 42 is responsible for securely distributing the new user ID/password information to the correct end users and securely archives the activated user ID account list for future reference.

The client certificates issued for LCMS admin cards and system users will periodically expire. When the certificates expire, a new certificate must be generated and downloaded to the LCMS admin card or the remote system in a process referred to herein as the certificate re-issuance process. The certificate re-issuance process employs, for example, a certificate check cron job. A cron is a Unix command for scheduling jobs to be executed sometime in the future. In an embodiment of the invention, once daily, the cron job on the RA 14 starts up a Perl script to notify end users targeted according to their roles that their certificates are soon to expire. The LDAP Directory 18 is referenced for each user with a given role. The certificate is accessed, the expiration date is gleaned from the certificate, and the user's name and email address is accessed from the LDAP entry. If the user's name and email address do not exist in the LDAP 18, they are also gleaned from the certificate. The current GMT (Greenwich Mean Time) is compared to the expiration time of the certificate, and one week prior to certificate expiration, the script starts sending emails to the certificate owners advising them that their certificates are soon to expire and directing them to the RA web page for automatic renewal.

Figure 20:
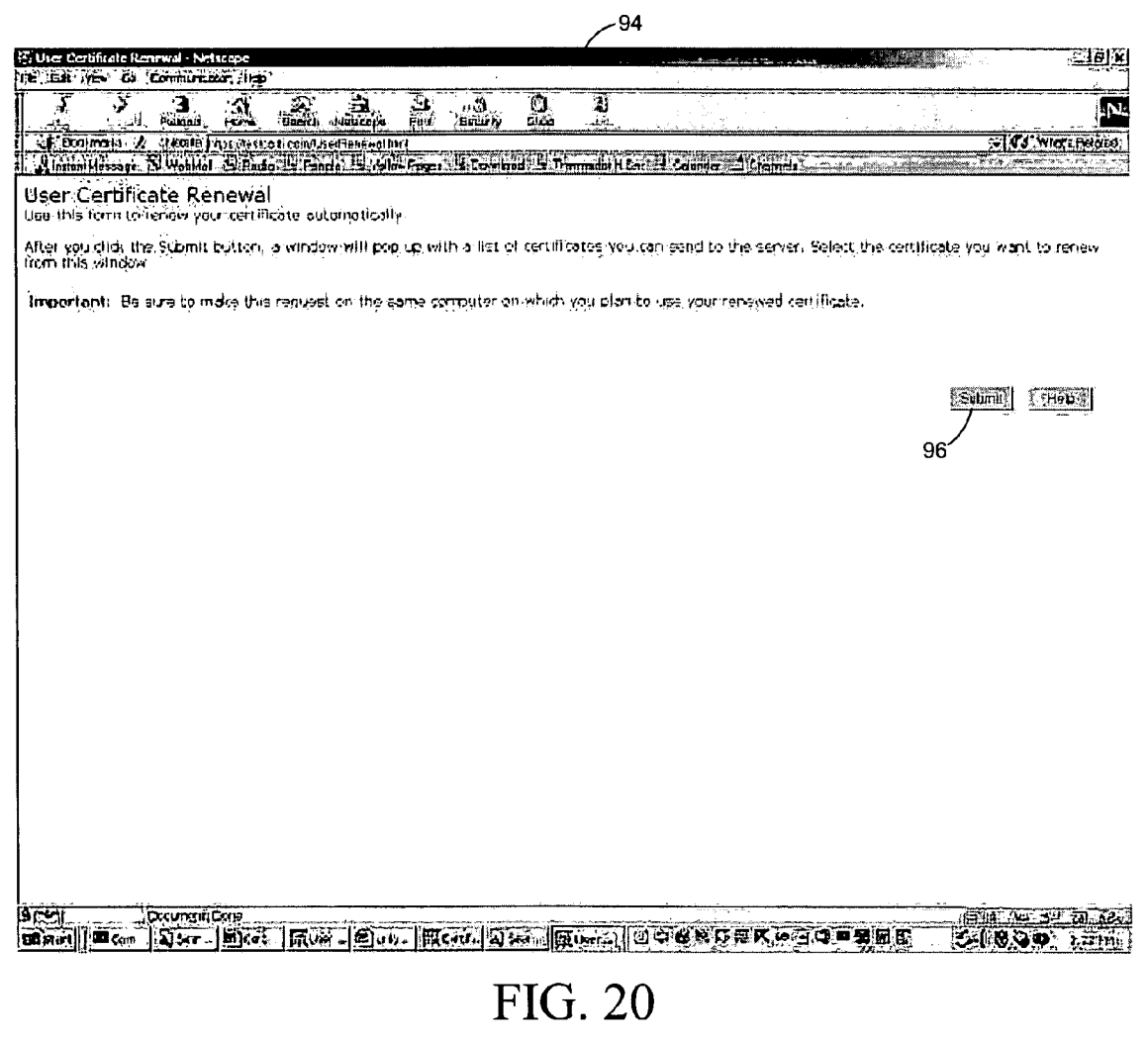
Figure 21:
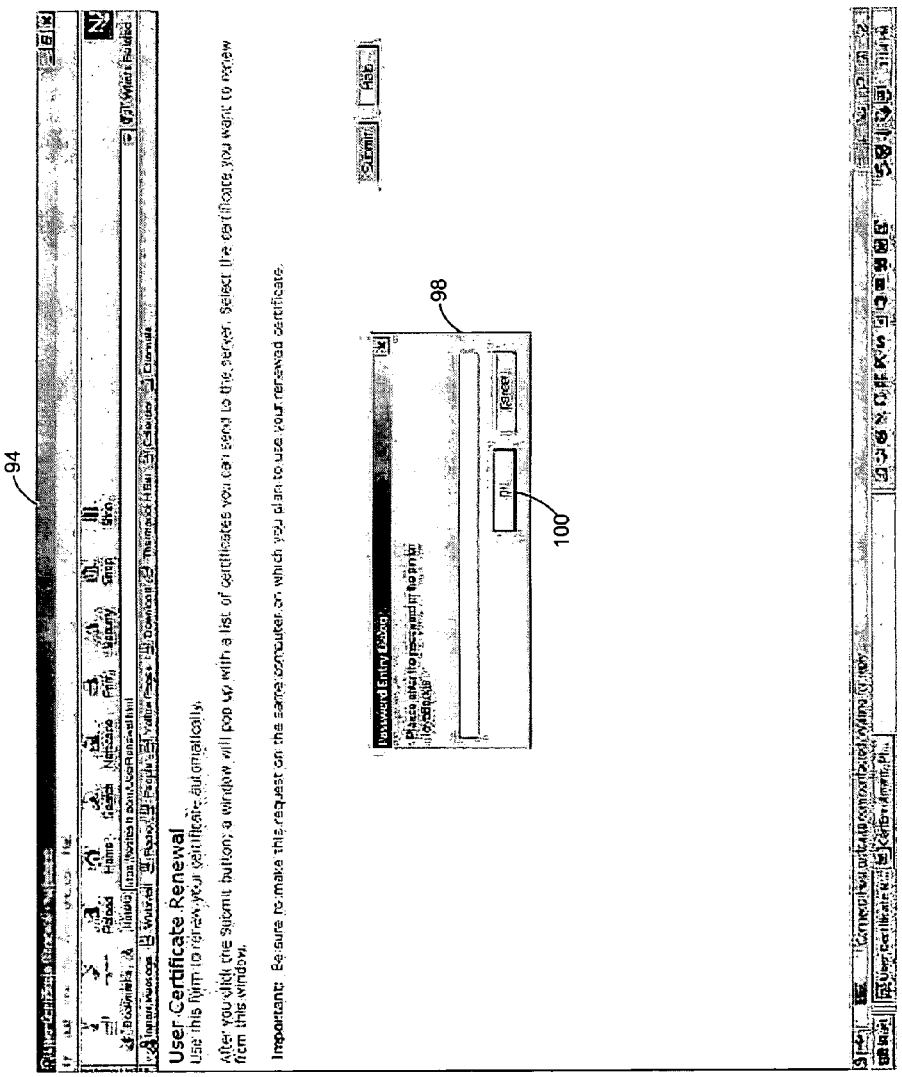
FIG. 21 shows an example of a 'Password Entry' dialog box of the 'User Certificate Renewal' page for an embodiment of the invention.
Figure 22:
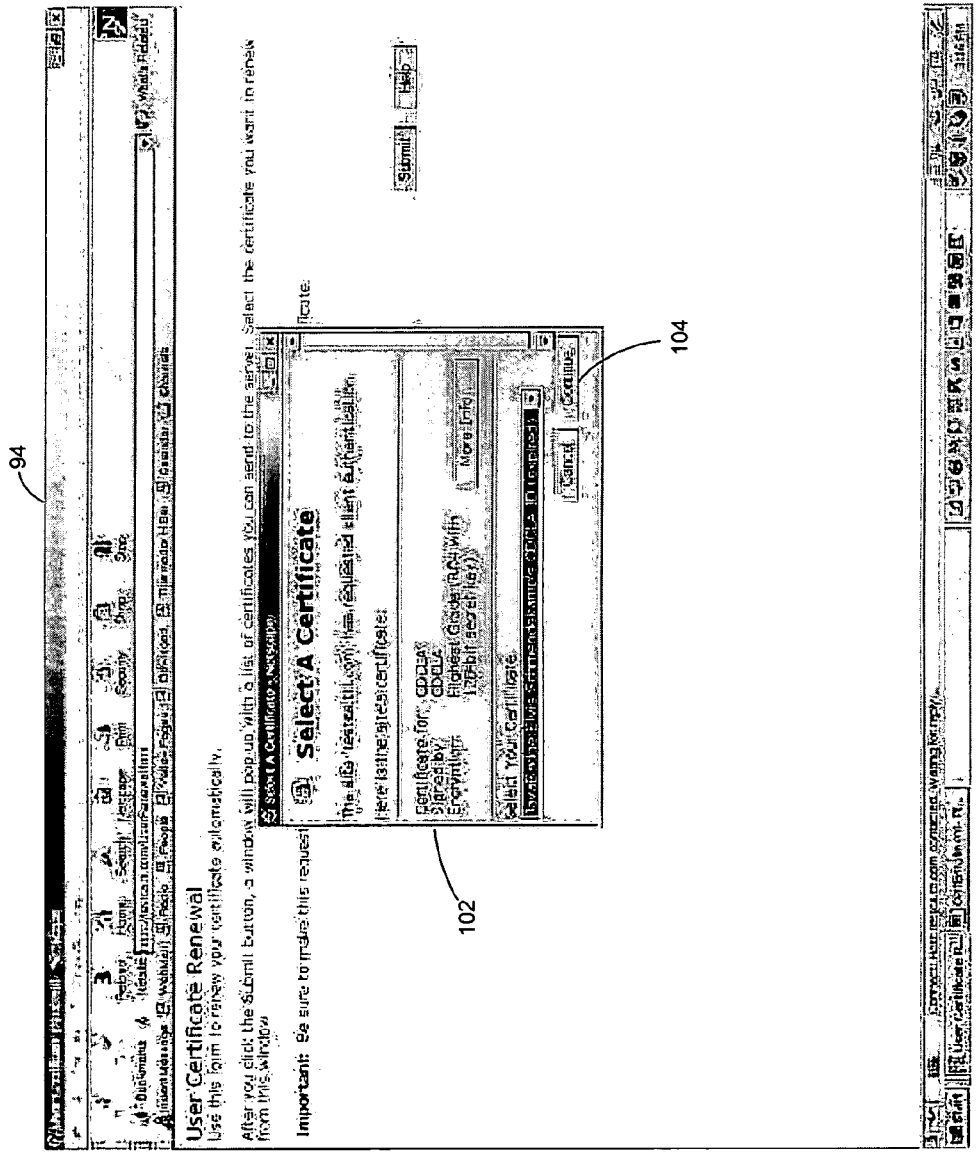
FIG. 22 shows an example of a "Select a Certificate" dialog box of the User Certificate Renewal page for an embodiment of the invention.
Figure 23:
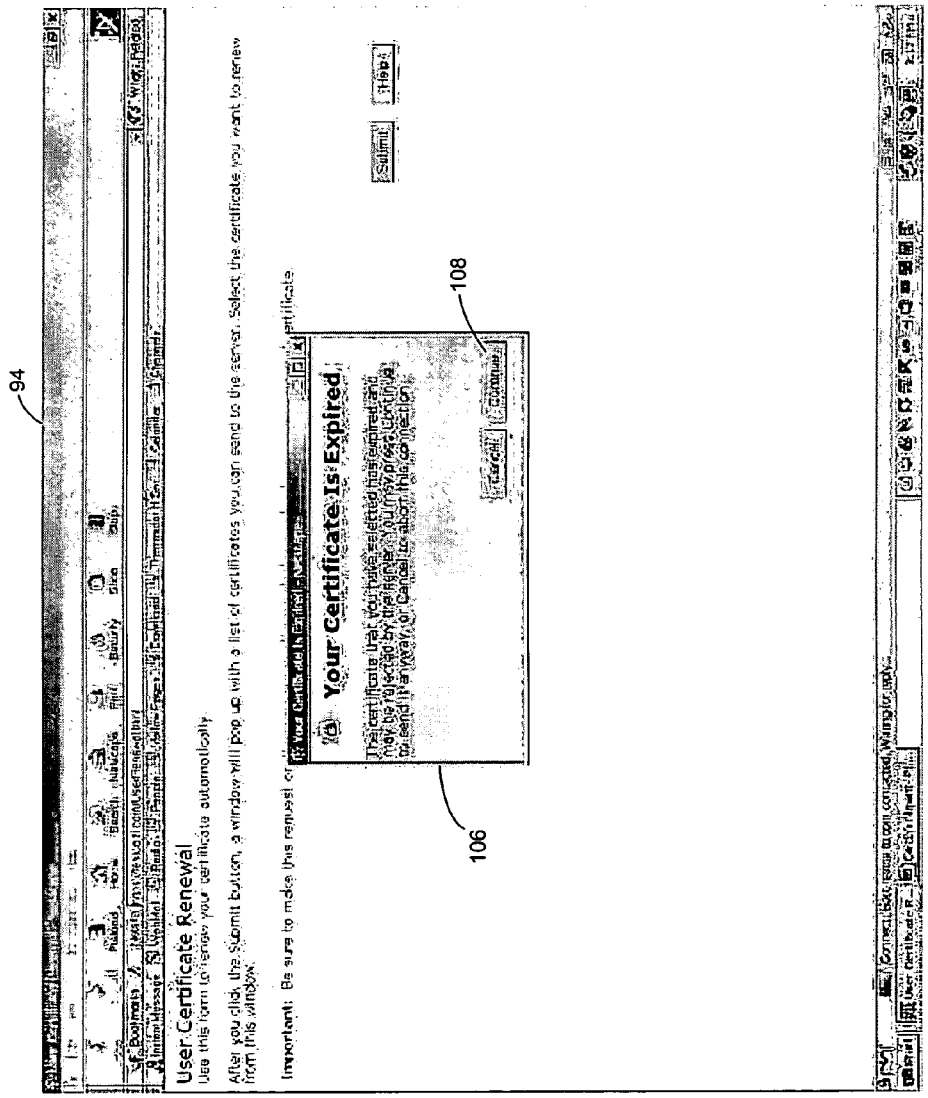
FIG. 23 shows an example of an 'Expired Certificate' dialog box displayed on the User Certificate Renewal page for an embodiment of the invention.
Figure 24:
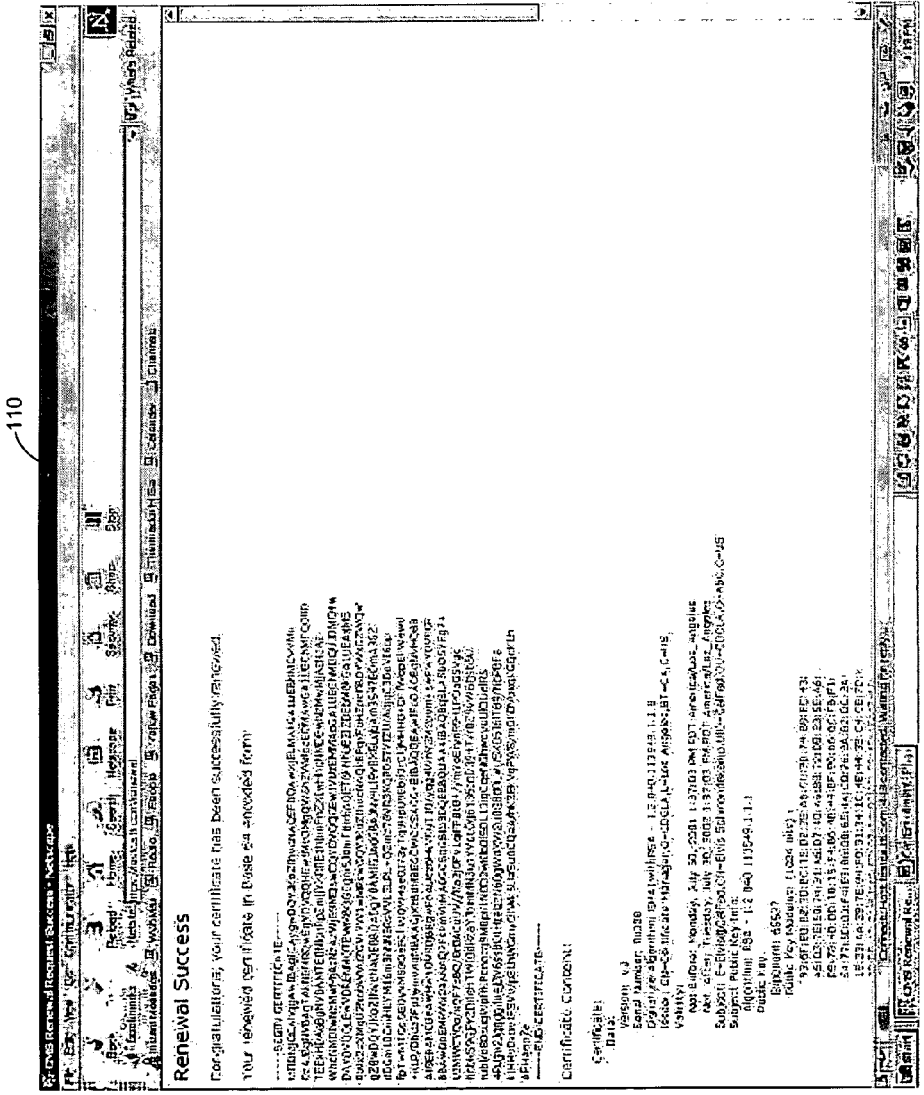
FIG. 24 shows an example of a 'Renewal Success' screen for an embodiment of the invention.

Thus, when a user's certificate is soon to expire, the user receives an email reminder to renew the user's certificate, and the email reminders continue, for example, once a day until the user completes the renewal process. The user can connect to the web page, for example, by clicking on a link name included in the email reminder. FIG. 20 illustrates an example of a 'User Certificate Renewal' web page 94 for an embodiment of the invention. On the User Certificate Renewal page 94, the user clicks on a 'Submit' button 96 and is then prompted for a password on a 'Password Entry' dialog box 98 of the 'User Certificate Renewal' page 94, an example of which is illustrated in FIG. 21. If the certificate is stored on a smart card, the user enters the user's card PIN, and if the certificate is stored in the browser, the user enters the password to the certificate storage database on the system. The user enters the PIN/password, clicks 'OK' 100, and a list of certificates that can be renewed by the particular CA 16 is displayed for the user on a "Select a Certificate" dialog box 103 of the User Certificate Renewal page 94, an example of which is shown in FIG. 22. The certificate to be renewed is selected by default, and upon verifying that the correct certificate is selected, the user clicks a 'Continue' button 104. If the certificate has expired, a notification of the expiration is displayed an 'Expired Certificate' dialog box 106 for the user on the User Certificate Renewal page 94, an example of which is illustrated in FIG. 23. The user then clicks a 'Continue' button 108 and the certificate request is processed. Thereafter, a 'Renewal Success' screen 110, an example of which is shown in FIG. 24, is displayed for the user. At this point, the updated certificate is now on the smart card or in the browser.

Figure 25:
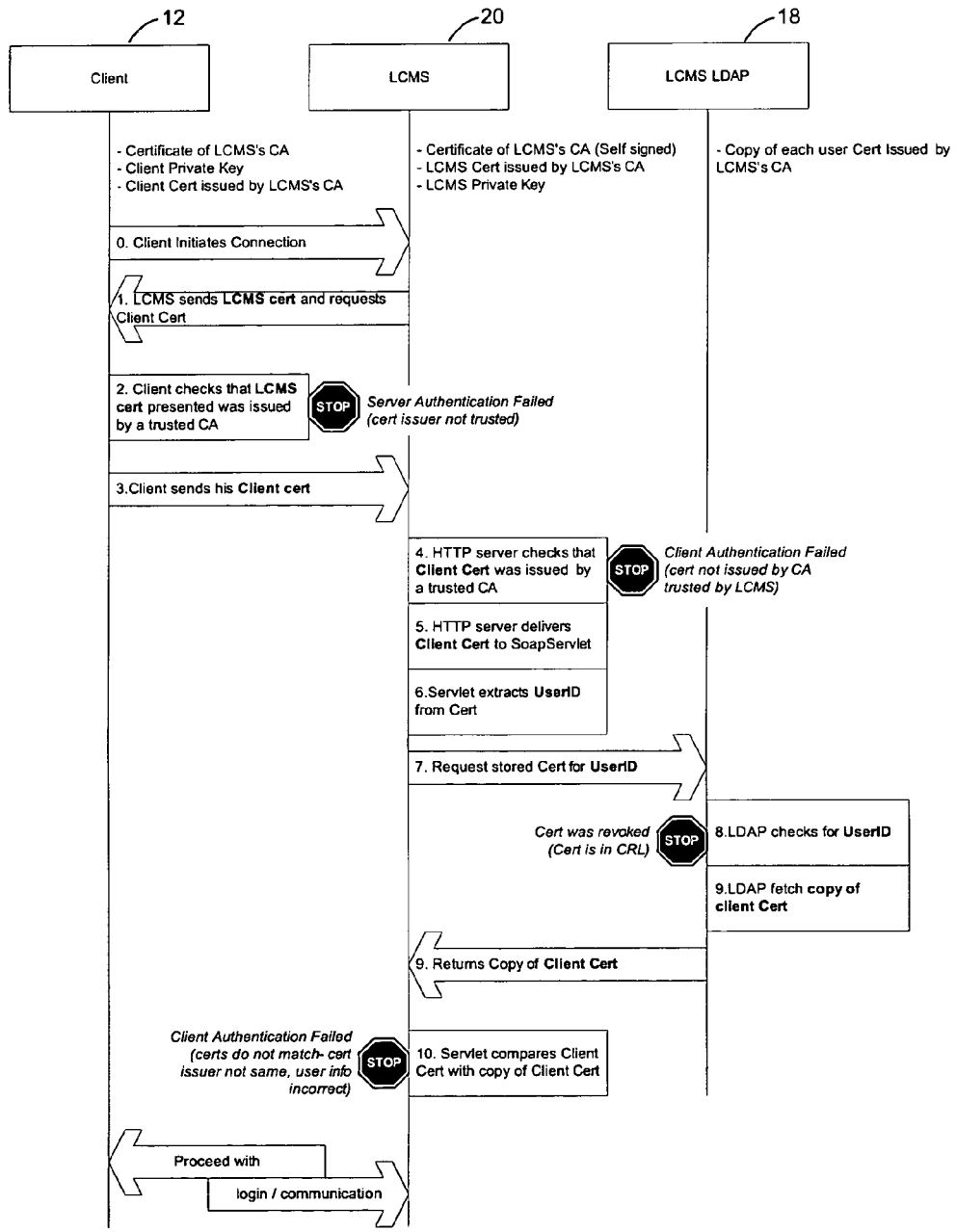
FIG. 25 is a flow chart that illustrates an example of the process of certificate based authentication to the LCMS for an embodiment of the present invention.

FIG. 25 is a flow chart that illustrates an example of the process of certificate based authentication to the LCMS 20 for an embodiment of the present invention. The process involves, for example, a Client 12 with the certificate of the CA 16 of the LCMS 20, the private key of the Client 12, and the client certificate issued by the CA 16 of the LCMS 20. In addition, the process involves the LCMS 20 with the certificate of its CA 16 self-signed, the LCMS certificate issued by the CA 16 of the LCMS 20, and the private key of the LCMS 20. The process further involves the LCMS LDAP 18 with a copy of each user certificate issued by the CA 16 of the LCMS 20. Referring to FIG. 25, at S140, the Client 16 initiates a connection to the LCMS 20, and at S141, the LCMS 20 sends the LCMS certificate to the Client 12 with a request for the client certificate. At S142, the Client 12 checks to confirm that the LCMS certificate presented was issued by a trusted CA 16, and if so, sends the client certificate to the LCMS 20. The client's certificate validates the client and the LCMS certificate validates the host application, in this case, LCMS. Referring further to FIG. 25, at S143, the HTTP Server 14 checks to confirm that the client certificate was issued by a trusted CA 16, and if so, delivers the client certificate to a servlet, which extracts the user ID from the client certificate. The LCMS 20 then sends a request for the stored client certificate for the extracted user ID to the LCMS LDAP 18. At S144, the LCMS LDAP 18 checks to confirm that the client certificate is un-revoked and not on the certificate revocation list, and if so, fetches a copy of the client certificate and returns the copy to the LCMS 20. At S145, the servlet compares the client certificate with the copy of the client certificate, and if a match is found, the Client's login/communication with the LCMS 20 is permitted to proceed.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the scope of the present invention.

What is claimed is:

1. A method for utilizing a certificate as an access method to a host system from one of a plurality of access points, comprising:

creating and distributing a certificate for certificate-based authentication to each of a plurality of storage methods consisting of a microcomputer of a smart card and at least one of a computer disk of a computing device disposed in a secure environment and a Hardware Security Module (HSM) associated with a computing device;

managing the certificate over a life span of the certificate at least in part via a Lightweight Directory Assistance protocol (LDAP) directory shared by a Certificate Authority (CA) and the host system; and allowing access to the host system using the certificate for public key-based authentication to the host system.

2. The method of claim 1, wherein creating and distributing the certificate for storage on the microcomputer of the smart card further comprises preparing a key pair for the card and placing a unique Personal Identification Number (PIN) on the card by an initialization workstation.

3. The method of claim 2, wherein creating and distributing the certificate for storage on the microcomputer of the smart card further comprises creating and signing the certificate by the CA in response to a request for the certificate received via a Registration Authority (RA).

4. The method of claim 2, wherein the certificate is downloaded to the card after utilizing a securely distributed one-time-use Personal Identification Number (PIN) which, with information from the card, is used to positively identify a user and card as a valid owner of the certificate.

5. The method of claim 3, wherein creating and distributing the certificate for storage on the microcomputer of the smart card further comprises posting a copy of the certificate to the LDAP directory shared by the CA and the host system in a location in which log-in rights and access rights for a holder of the card are identified to the host system.

6. The method of claim 5, wherein creating and distributing the certificate for storage on the microcomputer of the smart card further comprises distributing the card and PIN to the cardholder through separate channels for security.

7. The method of claim 1, wherein creating and distributing the certificate to at least one of the computer disk of the computing device disposed in a secure environment and the HSM associated with the computing device further comprises creating and distributing the certificate for storage on the computer disk of the computing device.

8. The method of claim 7, wherein creating and distributing the certificate for storage on the computer disk of the computing device further comprises creating the certificate via a badging station that interacts with the host system and stores an encrypted private key for the certificate on the computer disk at the badging station.

9. The method of claim 8, wherein creating and distributing the certificate for storage on the computer disk of the computing device further comprises allowing a user on an external system to request the certificate via the badging station and sending the user's request to the CA via the RA for creation of the certificate.

10. The method of claim 9, wherein creating and distributing the certificate for storage on the computer disk of the computing device further comprises creating the certificate by the CA and posting the certificate to the LDAP directory shared by the CA and the host system.

11. The method of claim 10, wherein creating and distributing the certificate for storage on the computer disk of the computing device further comprises sending an email notice of the certificate to the external system user and allowing downloading and storage of the certificate in response to a request by the system user.

12. The method of claim 1, wherein creating and distributing the certificate to at least one of the computer disk of the computing device disposed in a secure environment and the HSM associated with the computing device further comprises creating and distributing the certificate for storage on the HSM associated with the computing device.

13. The method of claim 12, wherein creating and distributing the certificate for storage on the HSM associated with the computing device further comprises creating a key pair by the HSM in response to a request for an external system user, storing a private key of the key pair on the HSM, and delivering only a public key of the key pair external to the HSM.

14. The method of claim 13, wherein creating and distributing the certificate for storage on the HSM associated with the computing device further comprises creating an entry in the LDAP directory for the external system user and sending the request to the CA by the RA.

15. The method of claim 14, wherein creating and distributing the certificate for storage on the HSM associated with the computing device further comprises receiving the request by the CAY verifying that the request is complete, creating the certificate, and sending an email to the system user confirming creation of the certificate.

16. The method of claim 15, wherein creating and distributing the certificate for storage on the HSM associated with the computing device further comprises allowing download and storage of the certificate, including only the public key, on a computer disk for the external system user.

17. The method of claim 1, wherein consistent tools and utilities are used to manage certificate creation, distribution, use and reissuance across all disparate user categories.

18. The method of claim 1, wherein managing the certificate over the life span of the certificate further comprises at least one of re-issuing the certificate in response to a request received upon notification of an approaching expiry for the certificate, sending notification of the approaching expiry for the certificate, issuing a new certificate in response to a request upon expiry of the certificate, revoking the certificate according to pre-defined parameters and simultaneously removing information regarding the revoked certificate from a user access definition within the LDAP directory shared by the CA and the host system.

19. The method of claim 1, wherein allowing access to the host system using the certificate for public key-based authentication further comprises allowing a cardholder to utilize the certificate stored within the microcomputer of the smart card to access an application on a host system server, such that when the user accesses the application on the server, the application requires that the card and certificate are present for authentication of the cardholder.

20. The method of claim 1, wherein allowing access to the host system using the certificate for public key-based authentication further comprises allowing an external system user to access an application on a host system server utilizing the certificate and associated keys stored on a disk of the computer of the external system for authentication of the system user to the host server.

21. The method of claim 1, wherein allowing access to the host system using the certificate for public key-based authentication further comprises allowing an external system user to access an application on a host system server utilizing the certificate and associated keys stored on the HSM which stores encryption keys and encrypts information passed into the HSM and passes the encrypted information out of the HSM and that is associated with the computing device of the external system user for authentication of the external system user to the host server.

22. The method of claim 1, wherein creating and distributing the certificate for storage on the microcomputer of the smart card further comprises initializing the card and creating a card data list.

23. The method of claim 22, wherein creating and distributing the certificate for storage on the microcomputer of the smart card further comprises setting an initial PIN on the card, preparing the card to receive a PKI certificate using authentication and digital signature smart card client software, and capturing pre-selected card initialization data for the initialized card by a card data list utility.

24. The method of claim 23, wherein creating and distributing the certificate for storage on the microcomputer of the smart card further comprises receiving an account request file related to an access request for a new card user account.

25. The method of claim 24, wherein creating and distributing the certificate for storage on the microcomputer of the smart card further comprises converting the account request file to an LDAP file, importing the LDAP file into an LDAP system to create an account for a pre-authorized card user, and creating a certificate account list.

26. The method of claim 25, wherein creating and distributing the certificate for storage on the microcomputer of the smart card further comprises producing a one-time use PIN for authorization to a RA certificate website for downloading the certificate for the pre-authorized card user.

27. The method of claim 26, wherein creating and distributing the certificate for storage on the microcomputer of the smart card further comprises accessing the RA certificate website from a browser of an issuing workstation, downloading the PKI certificate that enables the approved user to login to the host system to the initialized card using the browser and client software.

28. The method of claim 27, wherein creating and distributing the certificate for storage on the microcomputer of the smart card further comprises verifying a User Identification (UID), password, and PIN information with information stored in the LDAP system by the RA, and if the UID, password, and PIN information match the UID, password, and PIN information stored in the LDAP database, automatically approving the request, and sending the certificate to the CA by the RA for signing.

29. The method of claim 28, wherein creating and distributing the certificate for storage on the microcomputer of the smart card further comprises sending the signed certificate to the issuing workstation by the CA via the RA.

30. The method of claim 1, wherein creating and distributing the certificate for storage on at least one of the computer disk of the computing device and the HSM associated with the computing device further comprises receiving an account request file related to an access request for a new external system user.

31. The method of claim 30, wherein creating and distributing the certificate for storage on at least one of the computer disk of the computing device and the HSM associated with the computing device further comprises converting the account request file to a LDAP file, importing the LDAP file into an LDAP system to create an account for the new external system user, and creating a system account list.

32. The method of claim 31, wherein creating and distributing the certificate for storage on at least one of the computer disk of the computing device and the HSM associated with the computing device further comprises receiving a server certificate request for the new external system user, verifying the certificate request against the system account list, and publishing the certificate to the LDAP directory.

33. The method of claim 32, wherein creating and distributing the certificate for storage on at least one of the computer disk of the computing device and the HSM associated with the computing device further comprises allowing the new external system user to log into an RA website to import the certificate signed by the CA into a file-based certificate database.

34. The method of claim 33, wherein creating and distributing the certificate for storage on at least one of the computer disk of the computing device and the HSM associated with the computing device further comprises generating a private key and importing a signed public key and CA certificate into the file-based certificate database.

35. The method of claim 34, wherein creating and distributing the certificate for storage on at least one of the computer disk of the computing device and the HSM associated with the computing device further comprises storing the signed public key and CA certificate on said one of the computer disk of the computing device and the HSM associated with the computing device for the external system user.

36. The method of claim 1, wherein allowing access to the host system further comprises sending a host system certificate to a client terminal via which access is sought with a request for the client certificate by the host system.

37. The method of claim 36, wherein allowing access to the host further comprises confirming that the host system certificate presented was issued by a trusted CA, and if so, sending the client certificate to the host system by the client terminal.

38. The method of claim 37, wherein allowing access to the host system further comprises confirming that the client certificate was issued by a trusted CA, and if so, extracting a UID from the client certificate and sending a request for the stored client certificate to the host system LDAP.

39. The method of claim 38, wherein allowing access to the host system further comprises confirming that the client certificate is not revoked, and if not revoked, fetching a copy of the client certificate and returning the copy to the host system by the host system LDAP.

40. The method of claim 39, wherein allowing access to the host system further comprises comparing the client certificate with the copy of the client certificate, and if a match is found, permitting access via the client terminal to the host system.

41. A system for utilizing a certificate as an access method to a host system from one of a plurality of access points, comprising:
    means for creating and distributing a certificate for certificate-based authentication to each of a plurality of storage methods consisting of a microcomputer of an smart card and at least one of a computer disk of a computing device disposed in a secure environment and a Hardware Security Module (HSM) associated with a computing device;
    means for managing the certificate over a life span of the certificate at least in part via a Lightweight Directory Assistance Protocol (LDAP) directory shared by a Certificate Authority (CA) and the host system; and
    means for allowing access to the host system by the user at a client terminal using the certificate for public key-based authentication to an application on a host server.

* * * * *